(12) United States Patent
Lee et al.

(10) Patent No.: US 10,194,426 B2
(45) Date of Patent: Jan. 29, 2019

(54) METHOD AND APPARATUS FOR TRANSMITTING UPLINK DATA IN A WIRELESS COMMUNICATION SYSTEM

(71) Applicant: LG ELECTRONICS INC., Seoul (KR)

(72) Inventors: Eunjong Lee, Seoul (KR); Jaehoon Chung, Seoul (KR); Genebeck Hahn, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/119,200

(22) PCT Filed: Feb. 12, 2015

(86) PCT No.: PCT/KR2015/001422
§ 371 (c)(1),
(2) Date: Aug. 16, 2016

(87) PCT Pub. No.: WO2015/122701
PCT Pub. Date: Aug. 20, 2015

(65) Prior Publication Data
US 2017/0013610 A1    Jan. 12, 2017

Related U.S. Application Data

(60) Provisional application No. 61/940,475, filed on Feb. 16, 2014, provisional application No. 62/011,045, filed on Jun. 12, 2014.

(51) Int. Cl.
*H04L 1/00* (2006.01)
*H04W 74/08* (2009.01)
(Continued)

(52) U.S. Cl.
CPC .......... *H04W 72/0413* (2013.01); *H04L 1/00* (2013.01); *H04L 1/1861* (2013.01);
(Continued)

(58) Field of Classification Search
CPC .............. H04W 72/0413; H04W 74/08; H04L 1/1861; H04L 5/0044; H04L 5/0053; H04L 5/001; H04L 5/0023; H04L 5/0082
(Continued)

(56) References Cited

U.S. PATENT DOCUMENTS 8,638,738 B2    1/2014 Yang et al.
2011/0039568 A1    2/2011 Zhang et al.
(Continued)

OTHER PUBLICATIONS

PCT International Application No. PCT/KR2015/001422, International Search Report dated May 28, 2015, 4 pages.
(Continued)

*Primary Examiner* — Phong La
(74) *Attorney, Agent, or Firm* — Lee, Hong, Degerman, Kang & Waimey

(57) ABSTRACT

Provided are a method and apparatus for transmitting uplink data. Particularly, a method for transmitting uplink data in a wireless communication system, the method includes transmitting, by a user equipment, a scheduling request to a base station, and transmitting, by the user equipment, uplink data through a contention-based physical uplink shared channel (PUSCH) resource block that can transmit the uplink data without a uplink grant of the base station, wherein the scheduling request and the contention-based PUSCH resource block may be transmitted in an identical subframe.

15 Claims, 31 Drawing Sheets

(51) Int. Cl.
*H04W 72/04* (2009.01)
*H04L 5/00* (2006.01)
*H04L 1/18* (2006.01)

(52) U.S. Cl.
CPC .......... *H04L 5/0044* (2013.01); *H04L 5/0053* (2013.01); *H04W 74/08* (2013.01); *H04L 5/001* (2013.01); *H04L 5/0023* (2013.01); *H04L 5/0082* (2013.01)

(58) Field of Classification Search
USPC .......................................................... 370/329
See application file for complete search history.

(56) References Cited

U.S. PATENT DOCUMENTS

| | | | |
|---|---|---|---|
| 2011/0096745 A1* | 4/2011 | Ahn ...................... | H04L 5/0016 370/329 |
| 2011/0283157 A1* | 11/2011 | Yang .................... | H04L 1/1861 714/749 |
| 2011/0305179 A1* | 12/2011 | Wang ................... | H04L 1/0031 370/311 |
| 2011/0321050 A1 | 12/2011 | Ho et al. | |
| 2012/0044878 A1* | 2/2012 | Ratasuk ............ | H04W 74/0866 370/329 |
| 2012/0089880 A1* | 4/2012 | Nakao .................. | H04L 1/1607 714/748 |
| 2012/0213196 A1* | 8/2012 | Chung .................. | H04B 1/713 370/330 |
| 2012/0236816 A1 | 9/2012 | Park et al. | |
| 2012/0314671 A1* | 12/2012 | Noh ..................... | H04B 7/155 370/329 |
| 2013/0003672 A1* | 1/2013 | Dinan .................... | H04L 1/00 370/329 |
| 2013/0022012 A1 | 1/2013 | Lee et al. | |
| 2013/0058315 A1* | 3/2013 | Feuersanger ....... | H04W 52/281 370/336 |
| 2013/0107828 A1* | 5/2013 | Dinan ................. | H04W 52/346 370/329 |
| 2013/0121280 A1* | 5/2013 | Ouchi ................... | H04W 72/14 370/329 |
| 2013/0163534 A1* | 6/2013 | Anderson ............. | H04L 1/0026 370/329 |
| 2013/0163535 A1 | 6/2013 | Anderson et al. | |
| 2013/0163537 A1* | 6/2013 | Anderson ......... | H04W 72/1284 370/329 |
| 2013/0188580 A1* | 7/2013 | Dinan ................. | H04W 52/281 370/329 |
| 2016/0182199 A1* | 6/2016 | Webb ................... | H04L 5/0044 370/329 |

OTHER PUBLICATIONS

European Patent Office Application Serial No. 15749455.0, Search Report dated Aug. 29, 2017, 11 pages.

Nokia, et al., "SR associated contention based transmission", 3GPP TSG RAN WG2 Meeting #69, R2-101115, XP050421754, Feb. 2010, 4 pages.

3rd Generation Partnership Project (3GPP), "Technical Specification Group Radio Access Network; Evolved Universal Terrestrial Radio Access (E-UTRA); Medium Access Control (MAC) protocol specification (Release 11)," 3GPP TS 36.321 V11.4.0, XP050729376, Dec. 2013, 58 pages.

\* cited by examiner

[FIG. 1]
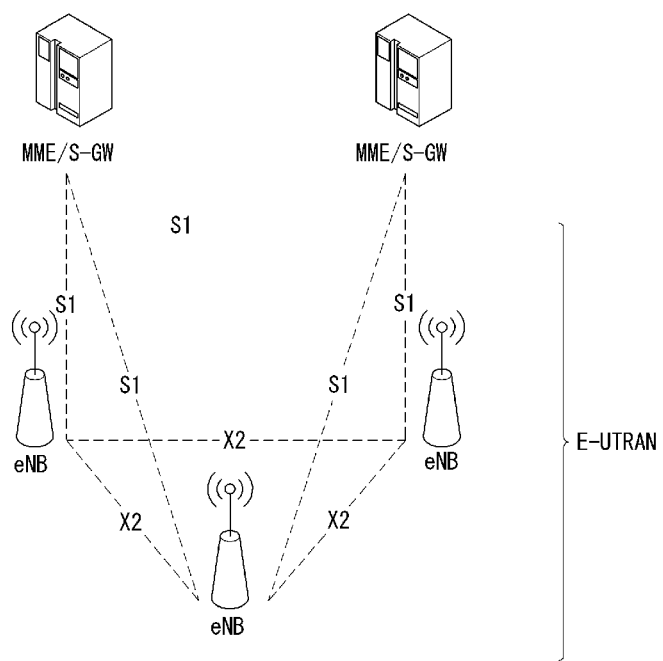

[FIG. 2]
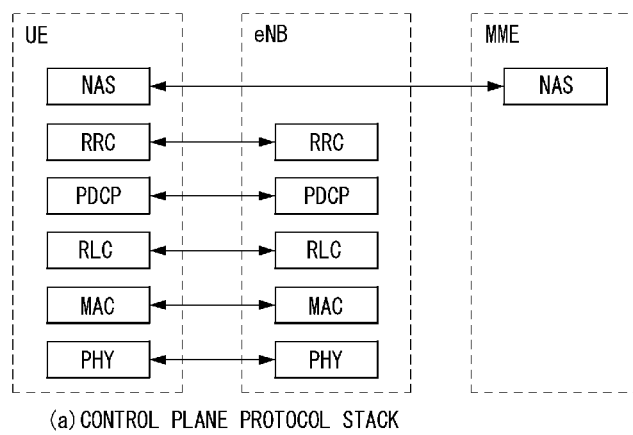
(a) CONTROL PLANE PROTOCOL STACK
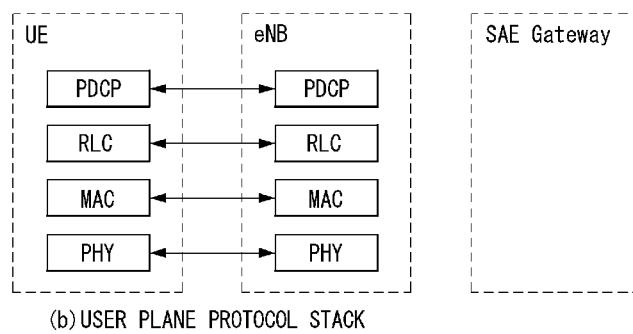
(b) USER PLANE PROTOCOL STACK

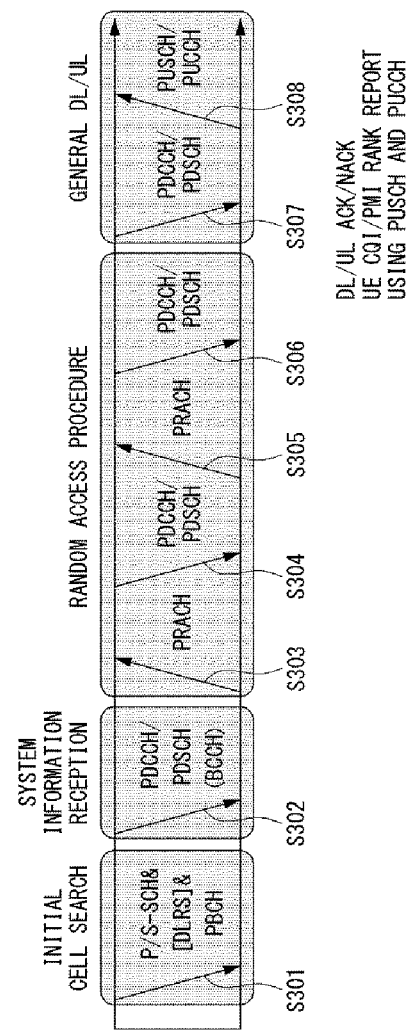
[FIG.3]

[FIG. 4]
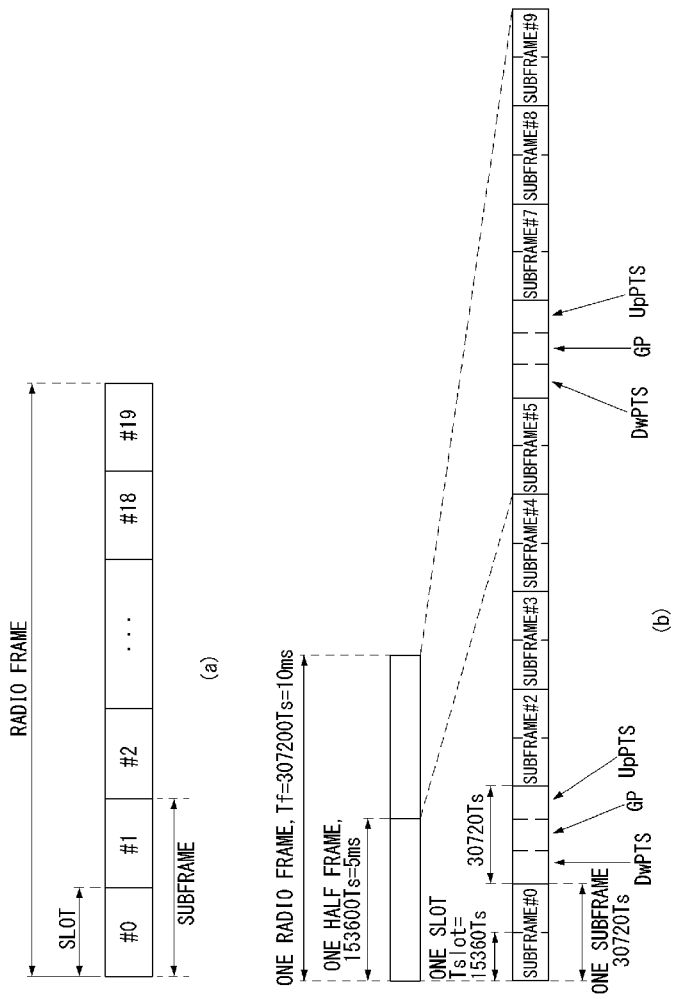

[FIG. 5]
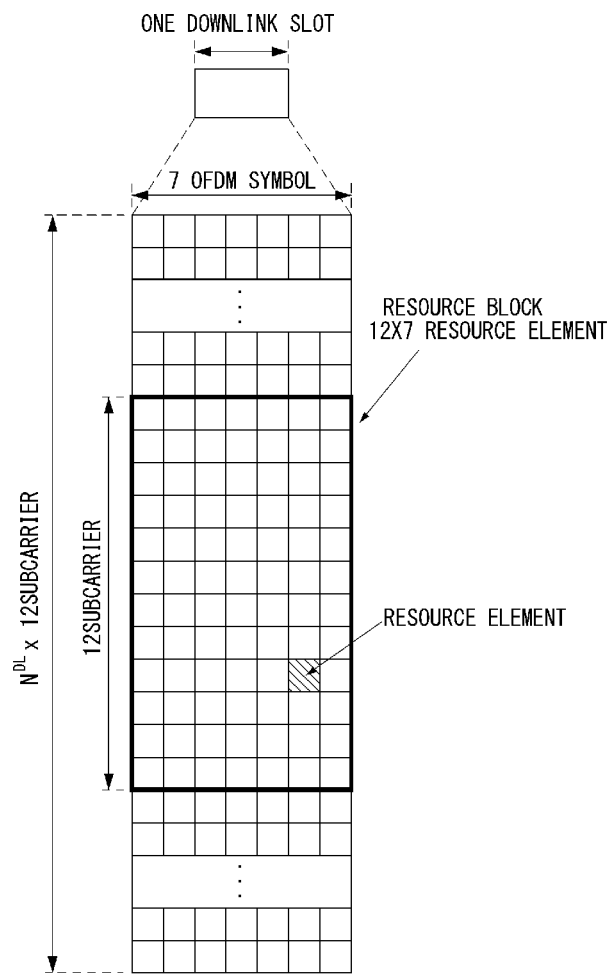

[FIG. 6]
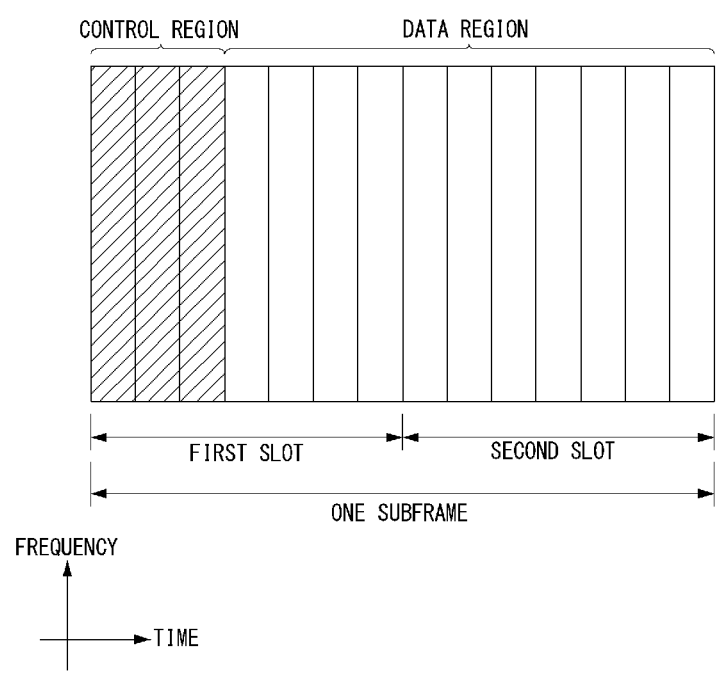

[FIG. 7]
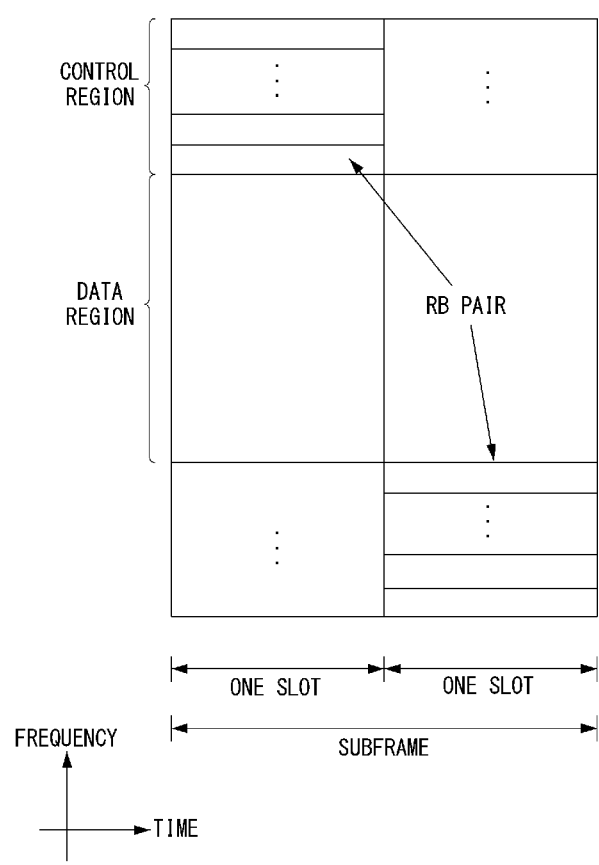

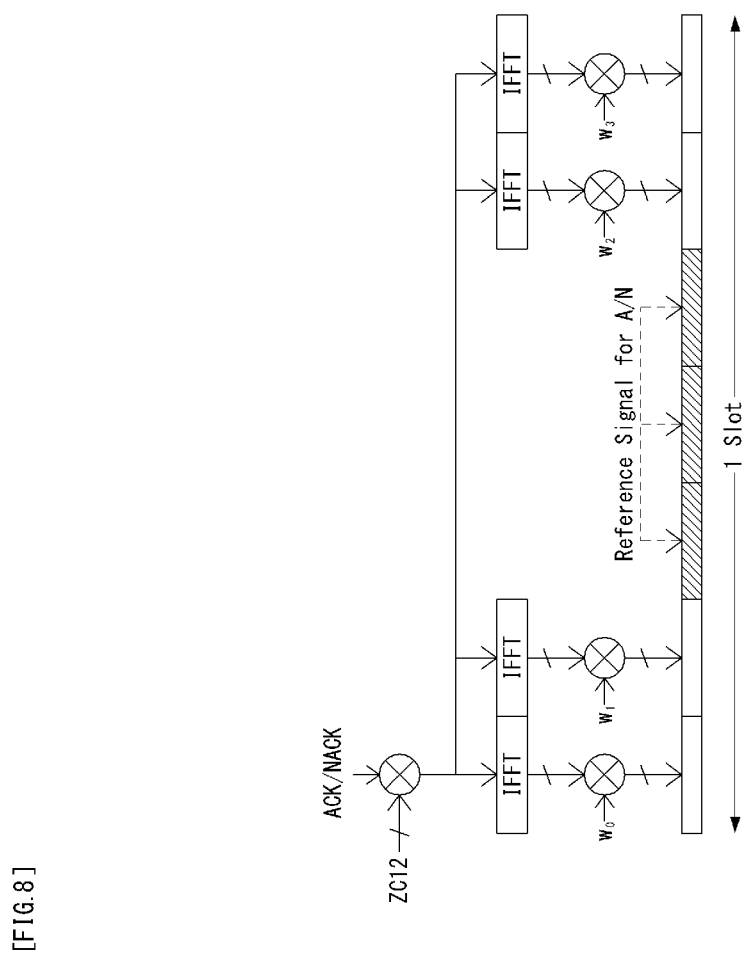
[FIG.8]

[FIG. 9]
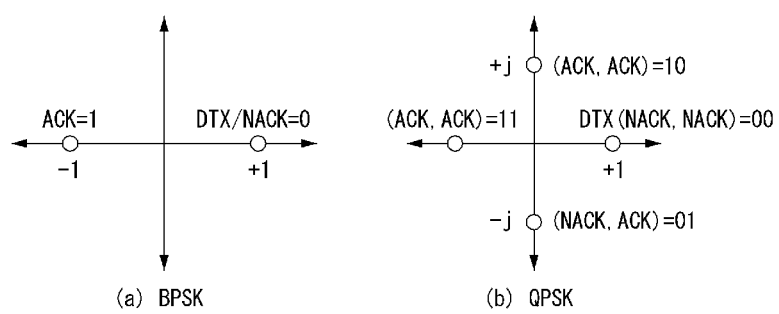

[FIG.10]
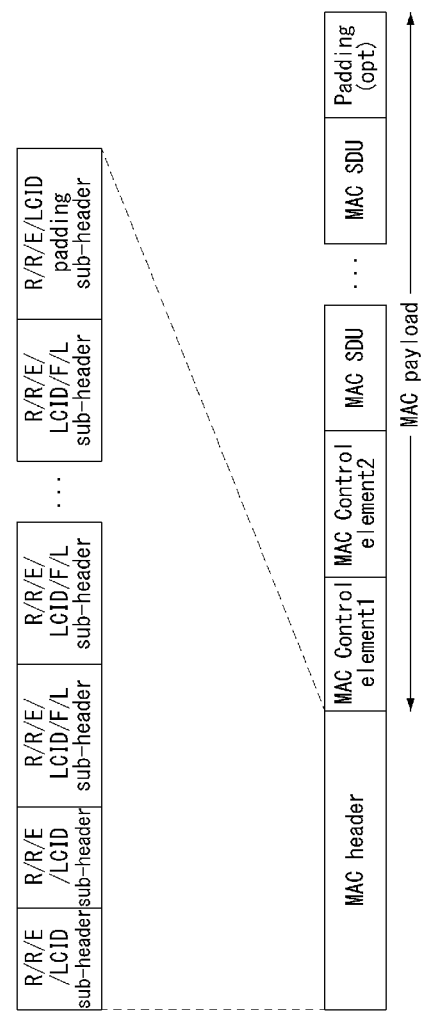

[FIG. 11]
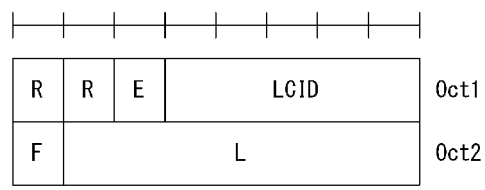
(a) R/R/E/LCID/F/L sub-header with
7-bit L field
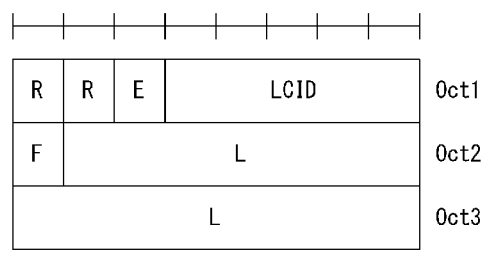
(b) R/R/E/LCID/F/L sub-header with
15-bit L field

[FIG. 12]
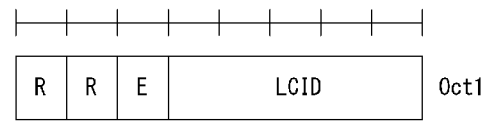
R/R/E/LCID sub-header

[FIG. 13]
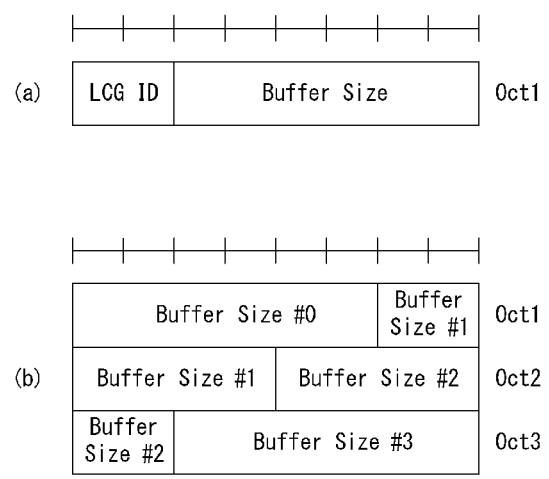

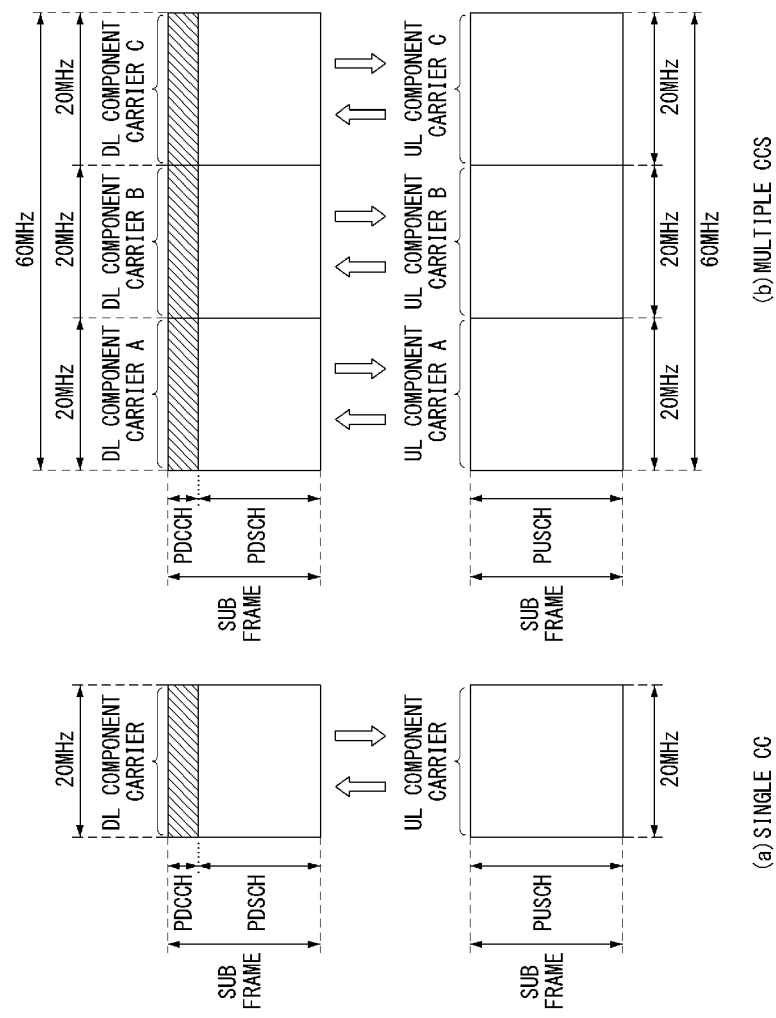
[FIG. 14]

[FIG. 15]
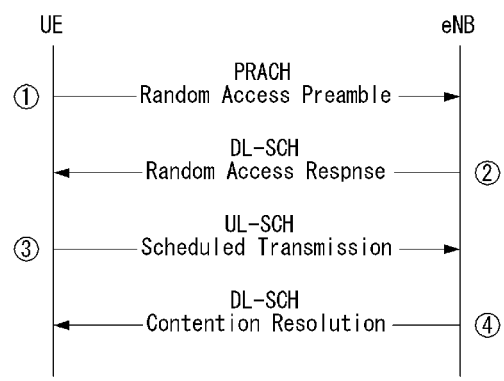

[FIG. 16]
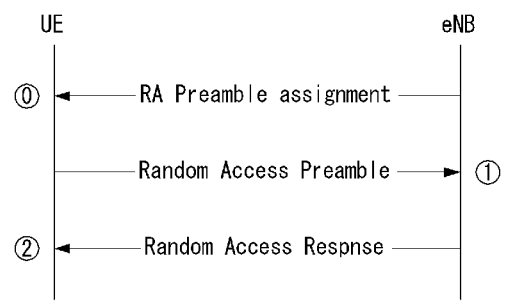

[FIG. 17]
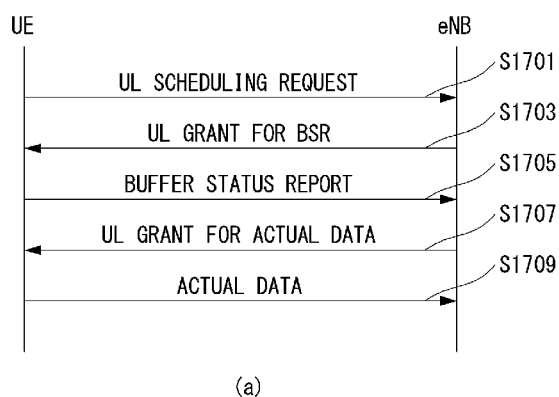
(a)
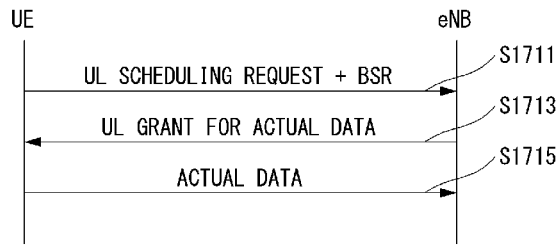
(b)

[FIG. 18]
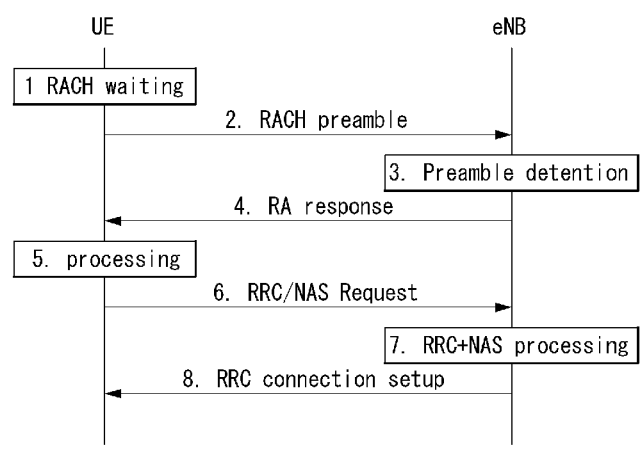

[FIG. 19]
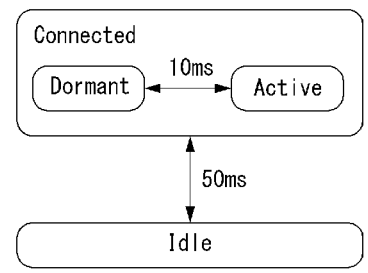

[FIG. 20]
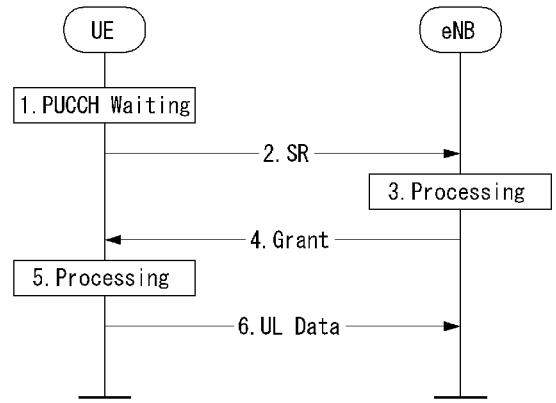

[FIG. 21]
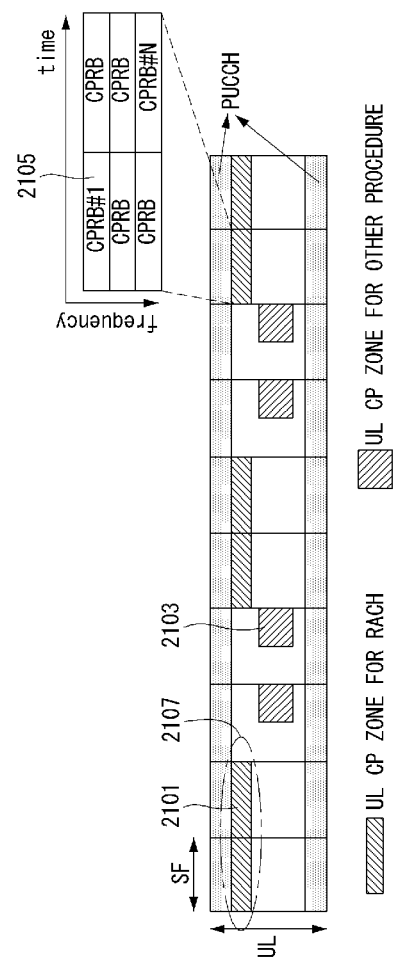

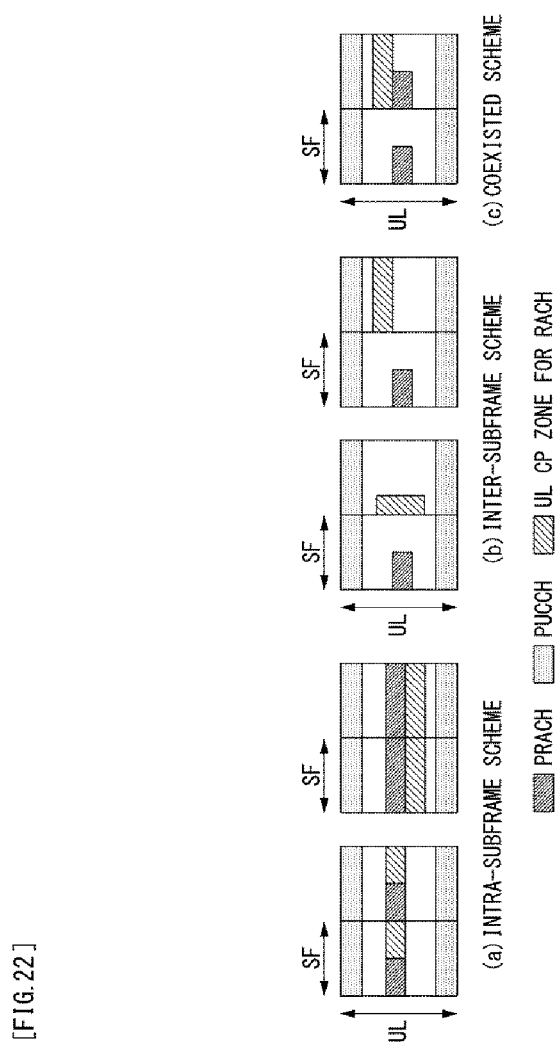

[FIG. 23]
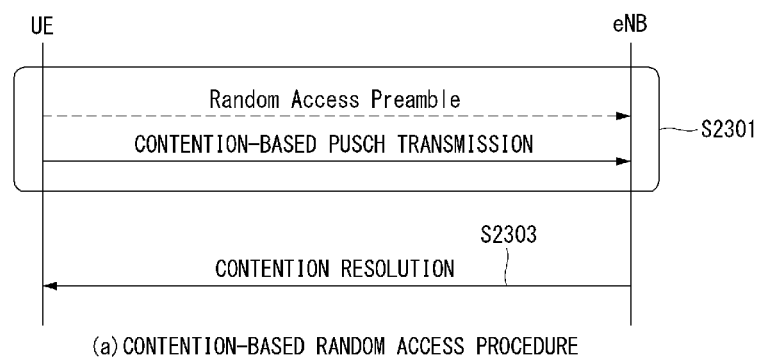
(a) CONTENTION-BASED RANDOM ACCESS PROCEDURE
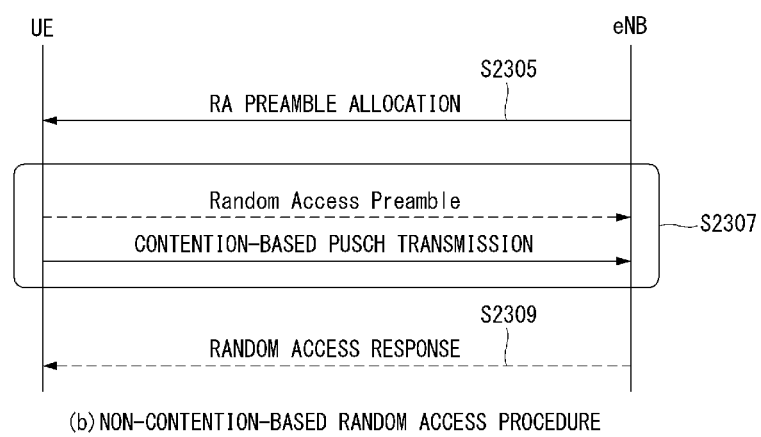
(b) NON-CONTENTION-BASED RANDOM ACCESS PROCEDURE

[FIG. 24]
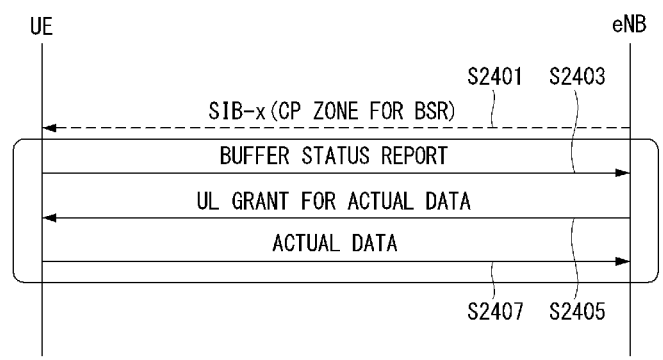
(a) UL RESOURCE ALLOCATION PROCEDURE OF 3 STEPS
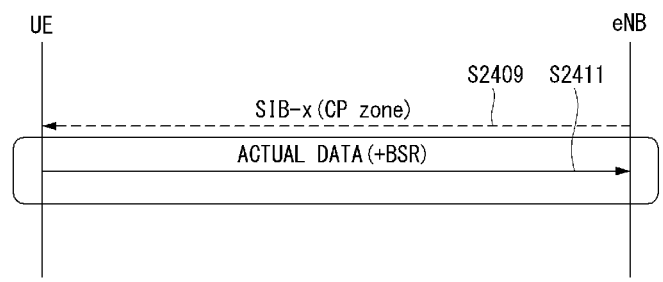
(b) UL RESOURCE ALLOCATION PROCEDURE OF 1 STEP

[FIG. 25]
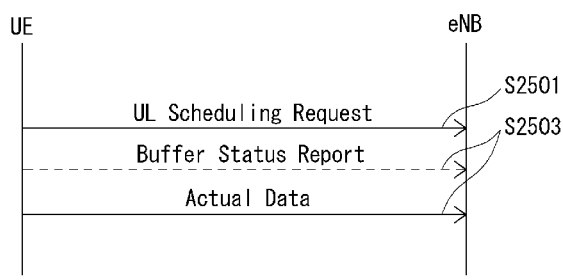

[FIG. 26]
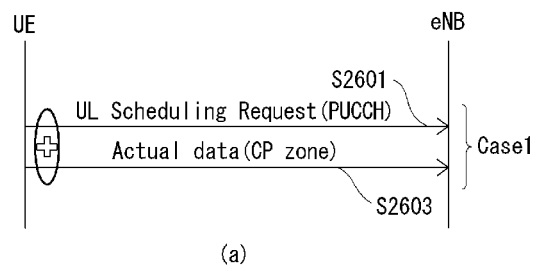
(a)
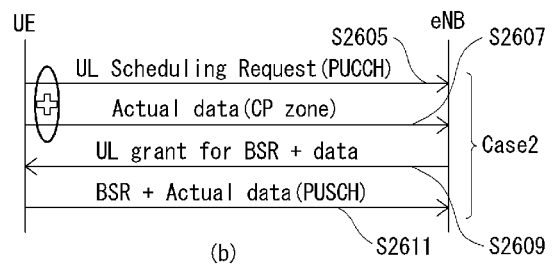
(b)

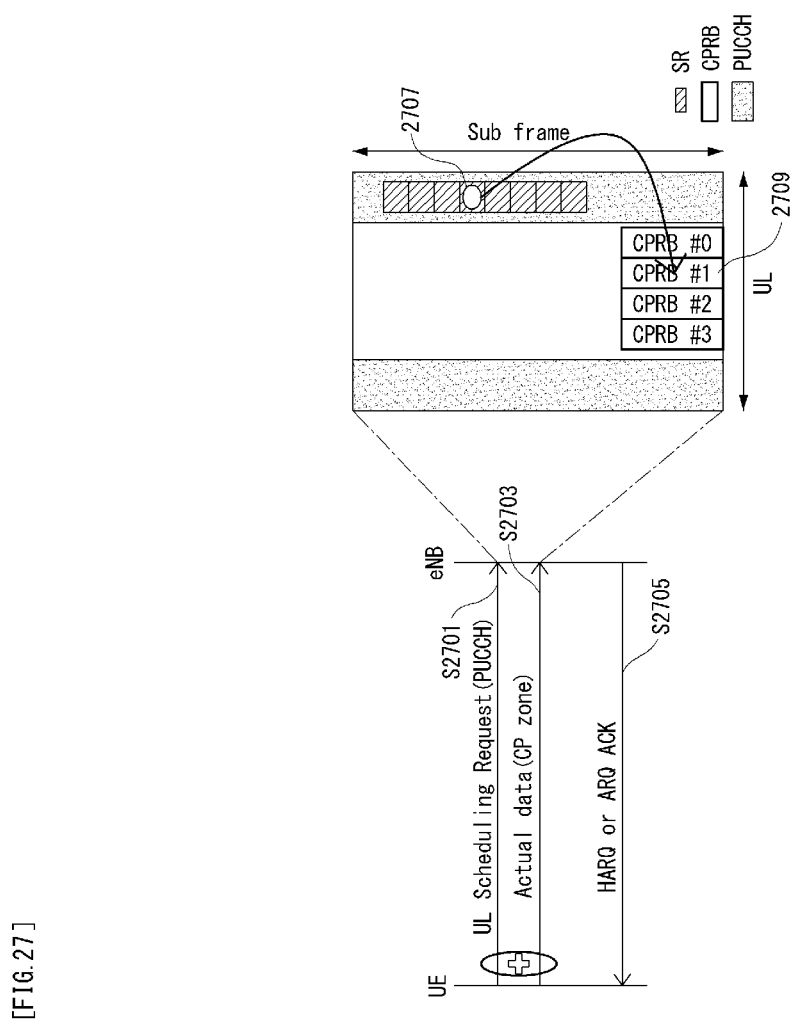
[FIG. 27]

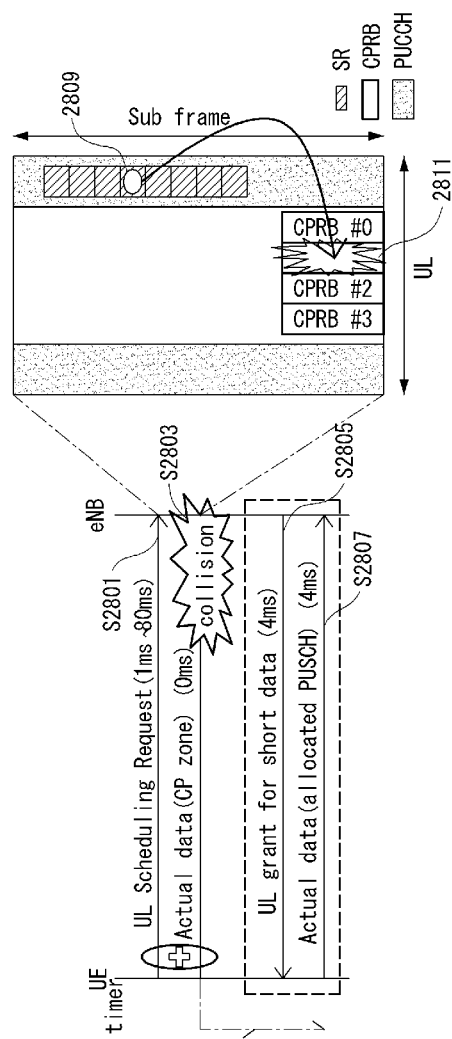
[FIG. 28]

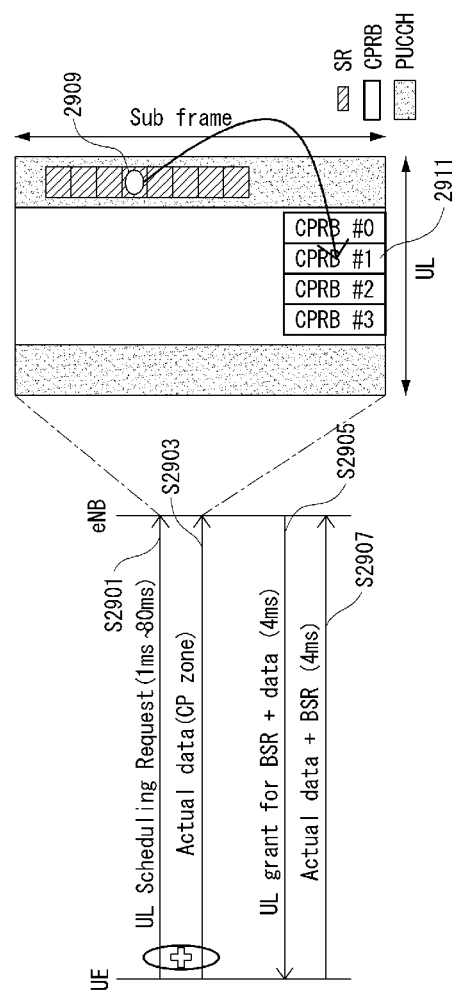
[FIG. 29]

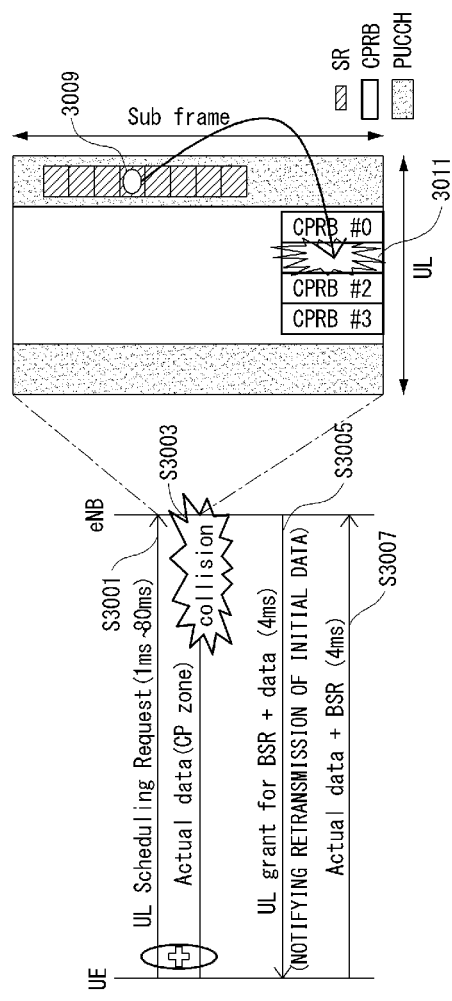
[FIG. 30]

[FIG. 31]
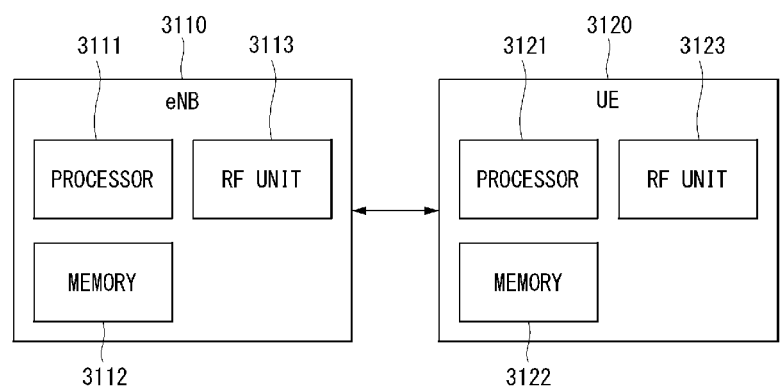

METHOD AND APPARATUS FOR TRANSMITTING UPLINK DATA IN A WIRELESS COMMUNICATION SYSTEM

CROSS-REFERENCE TO RELATED APPLICATIONS

This application is the National Stage filing under 35 U.S.C. 371 of International Application No. PCT/KR2015/001422, filed on Feb. 12, 2015, which claims the benefit of U.S. Provisional Application Nos. 61/940,475, filed on Feb. 16, 2014 and 62/011,045, filed on Jun. 12, 2014, the contents of which are all hereby incorporated by reference herein in their entirety.

TECHNICAL FIELD

The present invention relates to wireless communications and, more particularly, to a method for transmitting uplink data by a user equipment to a base station and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

In mobile communication systems, in order to maximize resource utilization, a method of transmitting and receiving data through a resource allocation procedure based on base station scheduling. However, this causes to increase latency in uplink data transmission of a user equipment.

In order to solve the above problem, the present invention proposes to define a contention-based radio resource region to minimize latency of a user equipment in wireless communication systems.

In addition, the present invention also proposes a method for rapidly performing the uplink data transmission of a user equipment, in case that the uplink data to be transmitted by a UE is generated from an application which is sensitive to delay or in case of transmitting the intermittent data of small size.

Additionally, the present invention proposes to define a scheduling request signal in order to rapidly transmit the uplink data generated from an application which is sensitive to delay or that of small size which occurs intermittently.

The technical problems solved by the present invention are not limited to the above technical problems and those skilled in the art may understand other technical problems from the following description.

Technical Solution

In an aspect, a method for transmitting uplink data in a wireless communication system is provided. The method includes transmitting, by a user equipment, a scheduling request to a base station; and transmitting, by the user equipment, uplink data through a contention-based physical uplink shared channel (PUSCH) resource block that can transmit the uplink data without a uplink grant of the base station, wherein the scheduling request and the contention-based PUSCH resource block may be transmitted in an identical subframe.

In another aspect, a user equipment for transmitting uplink data in a wireless communication system is provided. The user equipment includes a radio frequency (RF) unit for transmitting and receiving a radio signal, and a processor, wherein the process is configured to perform transmitting a scheduling request to a base station, and transmitting uplink data through a contention-based physical uplink shared channel (PUSCH) resource block that can transmit the uplink data without a uplink grant of the base station, wherein the scheduling request and the contention-based PUSCH resource block may be transmitted in an identical subframe.

Preferably, the contention-based PUSCH resource block may be determined based on a physical uplink control channel (PUCCH) resource index in which the scheduling request is transmitted.

Preferably, the scheduling request may indicate whether the uplink data is transmitted through the contention-based PUSCH resource block or may include information for indicating a characteristic for the uplink data.

Preferably, the user equipment may receive a hybrid automatic repeat request (HARD) or automatic repeat request (ARQ) acknowledgement (ACK) information, if the uplink data are successfully received by the base station.

Preferable, the user equipment may receive an uplink grant for retransmitting the uplink data from the base station, if the uplink data are not successfully received by the base station.

Preferable, the user equipment may receive an uplink grant for transmitting next uplink data of the uplink data and for a buffer state report, if the uplink data are successfully received by the base station.

Preferable, the user equipment may receive a hybrid automatic repeat request (HARQ) or automatic repeat request (ARQ) acknowledgement (ACK) information, if the uplink data are successfully received by the base station.

Preferable, the user equipment may receive an uplink grant for retransmitting the uplink data and for a buffer state report, if the uplink data are not successfully received by the base station.

Preferably, the uplink grant for retransmitting the uplink data and for a buffer state report may include a retransmission indicator for retransmitting the uplink data.

Preferable, the user equipment may receive a hybrid automatic repeat request (HARQ) or automatic repeat request (ARQ) non-acknowledgement (NACK) information, if the uplink data are not successfully received by the base station.

Advantageous Effects

According to embodiments of the present invention, by newly defining the contention-based radio resource region, the latency generated from an application which is sensitive to delay or generated intermittently transmitting data of small size can be minimized.

In addition, according to embodiments of the present invention, by newly defining the scheduling request signal, the uplink data generated from an application which is sensitive to the latency or data of small size generated intermittently can be smoothly transmitted.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 illustrates a schematic structure a network structure of an evolved universal mobile telecommunication system (E-UMTS) to which the present invention can be applied.

FIG. 2 illustrates the configurations of a control plane and a user plane of a radio interface protocol between the E-UTRAN and a UE in the wireless communication system to which the present invention can be applied.

FIG. 3 illustrates physical channels and a view showing physical channels used for in the 3GPP LTE/LTE-A system to which the present invention can be applied.

FIG. 4 is a diagram showing the structure of a radio frame used in a 3GPP LTE system to which the present invention can be applied.

FIG. 5 shows an example of a resource grid for one downlink slot in the wireless communication system to which the present invention can be applied.

FIG. 6 shows a structure of a downlink subframe in the wireless communication system to which the present invention can be applied.

FIG. 7 shows a structure of an uplink subframe in the wireless communication system to which the present invention can be applied.

FIG. 8 shows a structure of ACK/NACK in case of a normal CP in the wireless communication system to which the present invention can be applied.

FIG. 9 illustrates a method for multiplexing the ACK/NACK and the SR in the wireless communication system to which the present invention can be applied.

FIG. 10 illustrates the MAC PDU used in the MAC entity in the wireless communication system to which the present invention can be applied.

FIG. 11 and FIG. 12 illustrate the sub-header of the MAC PDU in the wireless communication system to which the present invention can be applied.

FIG. 13 illustrates formats of the MAC control elements in order to report the buffer state in the wireless communication system to which the present invention can be applied.

FIG. 14 represents an example of component carrier and carrier aggregation in the wireless communication system to which the present invention can be applied.

FIG. 15 is a diagram for describing the contention-based random access procedure in the wireless communication system to which the present invention can be applied.

FIG. 16 is a diagram for describing the non-contention-based random access procedure in the wireless communication system to which the present invention can be applied.

FIG. 17 illustrates a UL resource allocation procedure of a UE in the wireless communication system to which the present application can be applied.

FIG. 18 is a diagram for describing a latency taken for each contention-based random access procedure required in 3GPP LTE-A system to which the present application can be applied.

FIG. 19 is a diagram for describing a latency taken in C-plane required in 3GPP LTE-A system to which the present invention can be applied.

FIG. 20 is a diagram for describing a transition time from the dormant state to the active state for a synchronized UE required in 3GPP LTE-A to which the present invention can be applied.

FIG. 21 illustrates an example of a contention-based radio resource configuration according to an embodiment of the present invention.

FIG. 22 illustrates an example of a contention-based radio resource configuration according to an embodiment of the present invention.

FIG. 23 illustrates a random access procedure using the contention-based radio resource according to an embodiment of the present invention.

FIG. 24 illustrates a UL resource allocation procedure using a contention-based radio resource according to an embodiment of the present invention.

FIG. 25 illustrates a UL data transmission method according to an embodiment of the present invention.

FIG. 26 illustrates a UL data transmission method according to an embodiment of the present invention.

FIG. 27 illustrates a UL data transmission method according to an embodiment of the present invention.

FIG. 28 illustrates a UL data transmission method according to an embodiment of the present invention.

FIG. 29 illustrates a UL data transmission method according to an embodiment of the present invention.

FIG. 30 illustrates a UL data transmission method according to an embodiment of the present invention.

FIG. 31 is a block diagram of a wireless communication apparatus according to an embodiment of the present invention.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention May be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the configurations of a control plane and a user plane of a radio interface protocol between the E-UTRAN and a UE in the wireless communication system to which the present invention can be applied.

FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), preceding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD).

According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path delay of a downlink signal between the uplink and the downlink.

The structure of the radio frame is only exemplary and the number of subframes included in the radio frame, the number of slots included in the subframe, or the number of symbols included in the slot may be variously changed.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, . . . , NRB×12−1) denotes an index of subcarrier in the frequency domain, and l(l=0, . . . , 6) denotes an index of symbol in the time domain. The number NDL of resource blocks included in the downlink slot depends on a downlink transmission bandwidth determined in a cell.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARD). That is, the ACK/NACK signal for uplink data transmitted by a UE is transmitted over the PHICH.

a BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

PUCCH (Physical Uplink Control Channel)

A PUCCH for a UE is allocated to an RB pair in a subframe. The RBs belonging to the RB pair occupy different subcarriers in each of a first slot and a second slot. A frequency occupied by RBs belonged in the RB pair allocated to the PUCCH is changed based on a slot boundary. This is expressed that the RB pair allocated to the PUCCH is frequency-hopped in the slot boundary. A UE transmits UL control information through different subcarriers according to time, thereby obtaining a frequency diversity gain.

The PUCCH carries various sorts of uplink control information (UCI) according to format as follows.

SR (Scheduling Request): This is information used for requesting the UL-SCH resource. This information is transmitted using an on-off keying (OOK) method.

HARQ ACK/NACK: This is a response signal for DL data packet on a PDSCH. This information represents whether the DL data packet is successfully received. One bit of ACK/NACK is transmitted in response to a single DL codeword and two bits of ACK/NACK are transmitted in response to two DL codewords.

CSI (Channel State Information): This is feedback information for a DL channel. The CSI may include at least one of a channel quality indicator (CQI), a rank indicator (RI), a precoding matrix indicator (PMI) and a precoding type indicator (PTI). Twenty bits are used per subframe.

The quantity of control information that can be transmitted by a UE in a subframe may be determined depending on the number of SC-FDMA symbols (i.e., signifies SC-FDMA symbols other than SC-FDMA symbols used for reference signal (RS) transmission for detecting coherent detection of the PUCCH, but except for the last SC-FDMA symbol in a subframe in which a transmission of sounding reference signal (SRS) is configured).

The PUCCH may be defined by seven sorts of different formats depending on the control information, a modulation technique, a quantity of the control information, etc. which is transmitted, and the property of uplink control information (UCI) transmitted according to each of the PUCCH formats may be summarized as Table 1 below.

TABLE 1

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

Referring to Table 1, PUCCH format 1 is used for a single transmission of a scheduling request (SR). Wave forms which are not modulated are applied to the single transmission of SR, and this will be described below in detail.

PUCCH format 1a or 1b is used for transmitting HARQ acknowledgement/non-acknowledgement (ACK/NACK). When the HARQ ACK/NACK is solely transmitted in an arbitrary subframe, PUCCH format 1a or 1b may be used. Or, the HARQ ACK/NACK and the SR may be transmitted in a same subframe by using PUCCH format 1a or 1b.

PUCCH format 2 is used for transmitting the CQI, and PUCCH format 2a or 2b is used for transmitting the CQI and the HARQ ACK/NACK. In case of an extended CP, PUCCH format 2 may also be used for transmitting the CQI and the HARQ ACK/NACK.

PUCCH format 3 is used for carrying an encoded UCI of 48 bits. PUCCH format 3 may carry the HARQ ACK/NACK for a plurality of serving cells, the SR (if existed) and the CSI report for a serving cell.

PUCCH format 1/1a/1b will be described below.

FIG. 8 shows a structure of ACK/NACK in case of a normal CP in the wireless communication system to which the present invention can be applied.

FIG. 8 illustrates a PUCCH channel structure for transmitting HARQ ACK/NACK without CQI.

A confirmation response information (in a state of not scrambled) of 1 bit or 2 bits may be represented as a HARQ ACK/NACK modulation symbol using the BPSK and QPSK modulation techniques, respectively. An affirmative confirmation response (ACK) may be encoded as '1', and a negative confirmation response (NACK) may be encoded as '0'.

When transmitting a control signal in an allocated bandwidth, two dimensional spread is applied in order to increase a multiplexing capacity. That is, a spread in frequency domain and a spread in time domain are simultaneously applied in order to increase the number of UE or the number of control channel that can be multiplexed.

In order to spread an ACK/NACK signal in frequency domain, a frequency domain sequence is used as a basic sequence. As the frequency domain sequence, Zadoff-Chu (ZC) sequence which is one of constant amplitude zero autocorrelation waveform sequences may be used.

That is, in PUCCH format 1a/1b, the symbol modulated using the BPSK or the QPSK modulation scheme is multiplied by the CAZAC sequence (e.g., the ZC sequence) of length 12. For example, the result of the CAZAC sequence $r(n)$ ($n=0, 1, 2, \ldots, N-1$) of length N multiplied to modulation symbol $d(0)$ is $y(0), y(1), y(2), \ldots, y(N-1)$. The symbols $y(0), y(1), y(2), \ldots, y(N-1)$ may be referred to as block of symbols.

Like this, different cyclic shifts (CS) are applied to the Zadoff Chu (ZC) sequence which is a basic sequence, and multiplexing of different UEs or different control channels may be applied. The number of CS resources supported by SC-FDMA symbol in PUCCH RBs which is for the HARQ ACK/NACK transmission is setup by a cell-specific higher layer signaling parameter ($\Delta_{shift}^{PUCCH}$).

After multiplying the CAZAC sequence to the modulation symbol, the block-wise spread using an orthogonal sequence is applied. That is, the ACK/NACK signal spread in a frequency domain is spread in a time domain by using an orthogonal spreading code. As for the orthogonal spreading code (or the orthogonal cover sequence or an orthogonal cover code (OCC)), a Walsh-Hadamard sequence or a Discrete Fourier Transform (DFT) sequence may be used. For example, the ACK/NACK signal may be spread by using the orthogonal sequence (w0, w1, w2, w3) of length 4 for four symbols. In addition, an RS is also spread through the orthogonal sequence of length 3 or length 2. This is referred to as an orthogonal covering (OC).

In case of a normal CP, in SC-FDMA symbols that are series of 3 middle parts out of 7 SC-FDMA symbols included in a slot, the reference signal (RS) is carried, and in the rest 4 SC-FDMA symbols, the ACK/NACK signal is carried. Meanwhile, in case of an extended CP, the RS may be carried in two consecutive symbols of the middle parts. The number and location of symbols used for the RS may be changed according to a control channel, and the number and location of symbols used for the ACK/NACK signal related may be changed according to the control channel as well.

For normal ACK/NACK information, the Walsh-Hadamard sequence having length 4 is used, and for shortened ACK/NACK information and the reference signal, a DFT of length 3 is used.

For the reference signal of an extended CP case, the Walsh-Hadamard sequence having length 2 is used.

Table 2 represents an orthogonal sequence of length 4 $[w(0) \ldots w(N_{SF}^{PUCCH}-1)]$ for PUCCH format 1a/1b.

TABLE 2

| Sequence index $n_{oc}^{(\tilde{p})} (n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

Table 3 represents an orthogonal sequence of length 3 $[w(0) \ldots w(N_{SF}^{PUCCH}-1)]$ for PUCCH format 1a/1b.

TABLE 3

| Sequence index $n_{oc}^{(\tilde{p})} (n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 4 represents an orthogonal sequence $[\overline{w}(\tilde{p})(0) \ldots \overline{w}(\tilde{p})(N_{RS}^{PUCCH}-1)]$ for the RS in PUCCH format 1/1a/1b.

| Sequence index $\overline{n}_{oc}^{(\tilde{p})} (n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

As described above, by using the CS resource in the frequency domain and the OC resource in the time domain, numerous UEs may be multiplexed in a code division multiplexing (CDM) method. That is, the ACK/NACK information and the RS of a great number of UEs may be multiplexed on the same PUCCH RB.

For the time domain spreading CDM like this, the number of extended codes that are supported for the ACK/NACK information is limited by the number of RS symbols. That is, since the number of SC-FDMA symbols in the RS transmission is less than the number of SC-FDMA symbols in the ACK/NACK information transmission, the multiplexing capacity of RS is smaller than the multiplexing capacity of ACK/NACK information.

For example, in case of a normal CP, the ACK/NACK information may be transmitted in four symbols. In case of an extended CP, three orthogonal spreading codes, not four, may be used. This is because the number of RS transmission symbols is limited to three, and three orthogonal spreading codes only may be used for the RS.

In case that three symbols are used for the RS transmission and four symbols are used for the ACK/NACK information transmission in one slot in the subframe of a normal CP, for example, if six cyclic shifts (CSs) can be used in the frequency domain and three orthogonal covering (OC) resources can be used in the time domain, the HARQ confirmation response from total 18 different UEs may be multiplexed in one PUCCH RB. If two symbols in one slot of a subframe of the extended CP are used for the RS transmission and four symbols are used for the ACK/NACK information transmission, for example, if six cyclic shifts (CSs) can be used in the frequency domain and two orthogonal covering (OC) resources can be used in the time domain, the HARQ confirmation response from total 12 different UEs may be multiplexed in the PUCCH RB.

Subsequently, PUCCH format 1 will be described. The schedule request (SR) is transmitted in a way of a UE being requested to be scheduled or a way of not being requested. The SR channel reuses the ACK/NACK channel structure in PUCCH format 1a/1b, and is configured in on-off keying (OOK) method based on an ACK/NACK channel design. In the SR, the reference signal is not transmitted. Accordingly, in the normal CP, the sequence of length 7 is used, and in the extended CP, the sequence of length 6 is used. For the SR and the ACK/NACK, different cyclic shifts or orthogonal covers may be allocated.

FIG. 9 illustrates a method for multiplexing the ACK/NACK and the SR in the wireless communication system to which the present invention can be applied.

The structure of SR PUCCH format 1 is identical to the structure of ACK/NACK PUCCH format 1a/1b illustrated in FIG. 9.

The SR is transmitted by using the on-off keying (OOK) method. Particularly, the UE transmits the SR having a modulation symbol d(0)=1 to request the PUSCH resource (a positive SR), and in case of not requesting the scheduling (a negative SR), nothing is transmitted. As the PUCCH structure for the ACK/NACK is reused for the SR, different PUCCH resource index (that is, a combination of different CS and orthogonal code) within a same PUCCH region may be allocated to the SR (PUCCH format 1) or to the HARQ ACK/NACK (PUCCH format 1a/1b). The PUCCH resource index that is going to be used by the UE for the SR transmission may be set by the UE-specific higher layer signaling.

In case that the UE is required to transmit the positive SR in the subframe in which the CQI transmission is scheduled, CQI is dropped and the SR only may be transmitted. Similarly, if a case is occurred that the SR and the SRS should be transmitted at the same time, the UE drops the CQI rather may transmit the SR only.

In case that the SR and the ACK/NACK are occurred in the same subframe, the UE transmits the ACK/NACK on the SR PUCCH resource that is allocated for the positive SR. In the meantime, in case of the negative SR, the UE transmits the ACK/NACK on the allocated ACK/NACK resource.

FIG. 9 illustrates a constellation mapping for the simultaneous transmission of the ACK/NACK and the SR. In particular, it illustrates that the NACK (or, in case of 2 MIMO codewords, NACK and NACK) is modulated to map to +1. Accordingly, it is processed as NACK when a discontinuous transmission (DTX) is occurred.

For the SR and persistent scheduling, the ACK/NACK resource consisting of a CS, an OC, and a physical resource block (PRB) may be allocated to the UE through the radio resource control (RRC). Meanwhile, for the dynamic ACK/NACK transmission and non-persistent scheduling, the ACK/NACK resource may be allocated to the UE implicitly through the lowest CCE index of the PDCCH associated with the PDSCH.

In case of requiring resources for the UL data transmission, the UE may transmit the SR. That is, the SR transmission is triggered by an event.

The SR PUCCH resource is configured by a higher layer signaling except a case that the SR is transmitted with the HARQ ACK/NACK by using PUCCH format 3. That is, it is configured by a SchedulingRequestConfig information element that is transmitted through the radio resource control (RRC) message (for example, RRC connection reconfiguration message).

Table 5 exemplifies the SchedulingRequestConfig information element.

TABLE 5

```
-- ASN1START
SchedulingRequestConfig ::=        CHOICE {
    release                            NULL,
    setup                              SEQUENCE {
        sr-PUCCH-ResourceIndex             INTEGER (0..2047),
        sr-ConfigIndex                     INTEGER (0..157),
        dsr-TransMax                       ENUMERATED {
                                               n4, n8, n16, n32, n64,
spare3, spare2, spare1}
    }
}
SchedulingRequestConfig-v1020 ::=  SEQUENCE {
    sr-PUCCH-ResourceIndexP1-r10       INTEGER (0..2047)
    OPTIONAL -- Need OR
}
-- ASN1STOP
```

Table 6 represents a field that is included in the SchedulingRequestConfig information element.

TABLE 6

SchedulingRequestConfig field descriptions dsr-TransMax
Parameter for the SR transmission. Value n4 corresponds to 4 transmissions, n8 corresponds to 8 transmissions and so on.
sr-ConfigIndex
Parameter($I_{SR}$). Values 156 and 157 are not applied to release 8.
sr-PUCCH-ResourceIndex, sr-PUCCH-ResourceIndexP1
Parameter($n_{PUCCH, SRI}^{(1, p)}$) for the respective antenna port P0 and P1.
E-UTRAN configures the sr-PUCCH-ResourceIndexP1 only in case that the sr-PUCCHResourceIndex is set.

Referring to Table 6, the UE receives sr-PUCCH-ResourceIndex parameter and sr-ConfigIndex parameter ($I_{SR}$) indicating the SR configuration index through the RRC message for the SR transmission. By the sr-ConfigIndex parameter, $SR_{PERIODICITY}$ indicating the periodicity when the SR is transmitted and $N_{OFFSET,SR}$ indicating the subframe where the SR is transmitted may be configured. That is, the SR is transmitted from a specific subframe that is periodically repeated according to $I_{SR}$ that is given by a higher layer. Also, the subframe resource and CDM/frequency division multiplexing (FDM) resource may be allocated to the resource for the SR.

Table 7 represents the SR transmission periodicity according to the SR configuring index and the SR subframe offset.

TABLE 7

| SR configuration Index $I_{SR}$ | SR periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR}$ − 5 |
| 15-34 | 20 | $I_{SR}$ − 15 |
| 35-74 | 40 | $I_{SR}$ − 35 |
| 75-154 | 80 | $I_{SR}$ − 75 |
| 155-156 | 2 | $I_{SR}$ − 155 |
| 157 | 1 | $I_{SR}$ − 157 |

Buffer Status Reporting (BSR)

FIG. 10 illustrates the MAC PDU used in the MAC entity in the wireless communication system to which the present invention can be applied.

Referring to FIG. 10, the MAC PDU includes a MAC header, at least one MAC service data unit (SDU) and at least one control element, additionally may include a padding. In some cases, at least one of the MAC SDUs and the MAC control elements may not be included in the MAC PDU.

As an example of FIG. 10, it is common that the MAC control elements are located ahead of the MAC SDUs. And the size of MAC control elements may be fixed or variable. In case that the size of MAC control elements is variable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 10, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 10, six header fields may be included. Particularly, the sub-header may include six header fields of R/R/E/LCID/F/L.

For the sub-header corresponding to the very last one among data fields included in the MAC PDU and the sub-header corresponding to the MAC control element of fixed size, as an example illustrated in FIG. 10, the sub-header that is included four header fields may be used. In case that the sub-header includes four fields like this, the four fields may be R/R/E/LCID.

FIG. 11 and FIG. 12 illustrate the sub-header of the MAC PDU in the wireless communication system to which the present invention can be applied.

Each field is described as below with reference to FIG. 11 and FIG. 12.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

3) LCID: Logical channel identification field identifies a logical channel corresponding to the relevant MAC SDU or identifies a type of the relevant MAC control element and padding. If the MAC SDU is associated with the sub-header, the LCID field may show which logical channel the MAC SDU is corresponding to, and if the MAC control element is associated with the sub-header, the LCID field may show what the MAC control element is.

Table 8 represents the value of LCID for the DL-SCH

TABLE 8

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 9 represents the value of LCID for the UL-SCH

TABLE 9

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index values among truncated BSR, short BSR, and long BSR in the LCID field.

The relationship of mapping between the index and the LCID value illustrated in Table 8 and Table 9 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used (FIG. 11 (a)), otherwise, the 15-bit L field may be used (FIG. 11 (b)). In case that the size of MAC control element is variable, the size of MAC control element may be defined by the L field. In case that the size of MAC control element is fixed, the size of MAC control element may be determined without the size of MAC control element being defined by the L field, accordingly the F and L field may be omitted as shown in FIG. 12.

FIG. 13 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 13 (a), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG, after MAC PDU is generated. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCID field of sub-header, the MAC control element corresponding to the sub-header, as shown in FIG. 13 (b), may include four buffer size fields indicating the buffer state of four groups having 0 to 3 LCG IDs. Each of the buffer size fields may be used for identifying the total amount of available data from different logical channel groups.

Carrier Aggregation

A communication environment considered in the embodiments of the present invention includes all multi-carrier environments. That is, a multi-carrier system or a carrier aggregation (CA) system used in the present invention refers to a system for aggregating and utilizing one or more component carriers having a bandwidth smaller than a target bandwidth, for wideband support.

In the present invention, multi-carrier refers to carrier aggregation. Carrier aggregation includes aggregation of contiguous carriers and aggregation of non-contiguous carriers. In addition, the number of component carriers aggregated in downlink and uplink may be differently set. The case where the number and/or bandwidth of downlink component carriers (DL CCs) and the number and bandwidth of uplink component carriers (UL CCs) are the same is referred to as symmetric aggregation and the case where the number and/or bandwidth of downlink component carriers (DL CCs) and the number and bandwidth of uplink component carriers (UL CCs) are different is asymmetric aggregation. Such carrier aggregation is used interchangeable with the terms "carrier aggregation", "bandwidth aggregation" or "spectrum aggregation".

Carrier aggregation configured by aggregating two or more CCs aims at support a bandwidth of up to 100 MHz in an LTE-A system. When one or more carriers having a bandwidth smaller than a target bandwidth are aggregated, the bandwidth of the aggregated carriers may be restricted to a bandwidth used in the existing system, for backward compatibility with the existing IMT system. For example, the existing 3GPP LTE system may support bandwidths of 1.4, 3, 5, 10, 15 and 20 MHz and an LTE_Advanced (LTE_A) system evolved from the LTE system may support a bandwidth greater than 20 MHz using only the bandwidths supported by the LTE system. Alternatively, the carrier aggregation system used in the present invention may define a new bandwidth so as to support CA, regardless of the bandwidths used in the existing system.

The above-described carrier aggregation environment may be called a multiple-cell environment. The cell is defined as a combination of downlink resources (DL CCs) and uplink resources (UL CCs), and the uplink resources are not mandatory. Accordingly, the cell may be composed of downlink resources alone or both downlink resources and uplink resources. If a specific UE has one configured serving cell, the UE may have one DL CC and one UL CC. If a specific UE has two or more configured serving cells, the UE may have DL CCs corresponding in number to the number of cells and the number of UL CCs may be equal to or less than the number of DL CCs, and vice versa. If a specific UE has a plurality of configured service cells, a carrier aggregation environment in which the number of DL CCs is greater than the number of UL CCs may also be supported. That is, carrier aggregation may be regarded as aggregation of two or more cells having different carrier frequencies (center frequencies of a cell). If carrier aggregation is supported, linkage between a carrier frequency (or a DL CC) of downlink resources and a carrier frequency (or a UL CC) of uplink resources may be indicated by system information. The DL CC and the UL CC may be referred to as DL cell and UL cell, respectively. The cell described herein should be distinguished from a "cell" as a general region covered by a BS.

A cell used in the LTE-A system includes a primary cell (PCell) and a secondary cell (SCell). The PCell and the SCell may be used as service cells. In case of a UE which is in an RRC_connected state but does not set carrier aggregation or supports carrier aggregation, only one serving cell composed of a PCell exists. In contrast, in case of a UE which is in an RRC_CONNECTED state and sets carrier aggregation, one or more serving cells exist. The serving cell includes a PCell and one or more SCell.

A serving cell (PCell and SCell) may be set through an RRC parameter. PhyCellId is a physical layer identifier of a cell and has an integer value from 0 to 503. SCellIndex is a short identifier used to identify an SCell and has an integer value from 1 to 7. A value of 0 is applied to the PCell and SCellIndex is previously given to be applied to the Scell. That is, a cell having a smallest cell ID (or a cell index) in ServCellIndex becomes the PCell.

The PCell refers to a cell operating on a primary frequency (e.g., a primary CC (PCC)). The PCell is used to perform an initial connection establishment process or a connection re-establishment process at a UE. The PCell may indicate a cell indicated in a handover process. The PCell refers to a cell for performing control-associated communication among serving cells set in a carrier aggregation environment. That is, a UE may receive a PUCCH allocated by a PCell to which the UE belongs and perform transmission and use only the PCell to acquire system information and change a monitoring procedure. In evolved universal terrestrial radio access (E-UTRAN), a UE supporting a carrier aggregation environment may change only the PCell for a handover procedure using an RRCConnectionReconfiguration message of a higher layer including mobilityControlInfo.

The SCell refers to a cell operating on a secondary frequency (e.g., a secondary CC (SCC)). Only one PCell may be allocated to a specific UE and one or more SCells may be allocated to the specific UE. The SCell may be configured after radio resource control (RRC) connection establishment and may be used to provide additional radio resources. A PUCCH is not present in cells except for the PCell among serving cells set in a carrier aggregation environment, that is, the SCells. E-UTRAN may provide all system information associated with the operation of an associated cell in an RRC_CONNECTED state via a dedicated signal when SCells are added to a UE supporting a carrier aggregation environment. Change of system information may be controlled by release and addition of the SCell. At this time, an RRCConnectionReconfiguration message of a higher layer may be used. The E-UTRAN may transmit a dedicated signal having a different parameter to each UE, rather than broadcasting a signal in the associated SCell.

After an initial security activation process begins, an E-UTRAN may configure a network by adding one or more SCells to a PCell initially configured in a connection establishment process. In a carrier aggregation environment, the PCell and the SCell may operate as respective CCs. In the following embodiments, a primary CC (PCC) may be used as the same meaning as the PCell and a secondary CC (SCC) may be used as the meaning as the SCell.

FIG. 14 represents an example of component carrier and carrier aggregation in the wireless communication system to which the present invention can be applied.

FIG. 14 (*a*) represents a single carrier structure that is used in a LTE system. There are DL CC and UL CC in component carrier. One component carrier may have 20 MHz frequency range.

FIG. 14 (*b*) represents a carrier aggregation structure that is used in a LTE-A system. FIG. 14 (*b*) represents a case that three component carriers having 20 MHz frequency are aggregated. There are three DL CCs and UL CCs respectively, but the number of DL CCs and UL CCs are not limited thereto. In case of the carrier aggregation, the UE enables to monitor three CCs at the same time, to receive the DL signal/data, and to transmit the UL signal/data.

If, N DL CCs are managed in a specific cell, the network may allocate M (M≤N) DL CCs. In this case, the UE may monitor the limited M DL CCs only and receive the DL signal. Also, the network may give a priority to L (L≤M≤N) DL CCs and have the prioritized DL CCs allocated to the UE, in this case, the UE should monitor the DL CCs without fail. This way may be applied for the UL transmission.

The linkage between the DL resource carrier frequency (or DL CC) and the UL resource carrier frequency (or UL CC) may be instructed by a higher layer message like RRC message or system information. For example, the combination of DL resource and UL resource may be configured by the linkage that is defined by system information block type 2 (SIB2). Particularly, the linkage may signify the mapping relationship between the DL CC through which the PDCCH carrying a UL grant is transmitted and the UL CC that uses the UL grant, or signify the mapping relationship between the DL CC (or UL CC) through which the data for HARQ is transmitted and the UL CC (or DL CC) through which the HARQ ACK/NACK signal is transmitted.

Random Access Procedure

Hereinafter, a random access procedure which is provided in a LTE/LTE-A system will be described.

The random access procedure is used in order for a UE to obtain the UL synchronization with an eNB or to be allocated with UL radio resource. After turning on the power of UE, the UE acquires the DL synchronization with an initial cell and receives the system information. The UE gains the information of the set of usable random access preamble and that of the radio resource which is used for the transmission of random access preamble. The radio resource that is used for the transmission of random access preamble may be specified as the combination of at least one subframe index and an index on the frequency domain. The UE transmits the random access preamble that is randomly selected from the set of random access preamble, and the eNB that receives the random access preamble transmits the timing alignment (TA) value for the UL synchronization to the UE through the random access response. The UE acquires the UL synchronization in this way.

The random access procedure shows common in frequency division duplex (FDD) and time division duplex (TDD). The random access procedure is irrelevant to the cell size, and the number of serving cell in case of the carrier aggregation being configured.

First, the following shows the case that a UE performs the random access procedure.

In case that the UE performs an initial access in a RRC idle state without any RRC connection to an eNB In case that the UE performs a RRC connection re-establishment procedure In case that the UE tries to an initial access to a target cell in a handover procedure In case that an random access procedure is requested by the command from eNB In case that there is any data that is going to be transmitted to UL in a non-synchronized condition during the RRC connected state In case that there is any data that is going to be transmitted to UL in a non-synchronized condition and in a condition that the radio resource designated for requesting the radio resource is not allocated during the RRC connected state In case that the UE positioning is performed in a condition that timing advance is required during the RRC connected state In case that restoration procedure is performed in a radio link failure or handover failure In 3GPP Rel-10, it is considered that the timing advance (TA) value that is applicable to a specific cell (for example, PCell) in a wireless access system that supports the carrier aggregation is applied to a plurality of cells in common. However, the UE may aggregate a plurality of cells that are included in different frequency bands (that is, spaced apart on the frequency domain) or a plurality of cells that have different propagation characteristics. In addition, in case of a specific cell, for the extension of coverage or the removal of coverage hole, in a condition that small cells(or a secondary eNB (SeNB)) such as a remote radio header (RRH) (that is, repeater), a femto cell, or a pico cell, etc. is arranged in the cell, the UE performs a communication with the eNB (that is, macro eNB), in case of performing the communication with the secondary eNB through another cell, a plurality of cell may have different characteristics of the propagation delay. In this case, if the UL transmission is performed in a way that one TA value is commonly applied to a plurality of cells, it may profoundly affect the synchronization of UL signals that are transmitted on a plurality of cells. Accordingly, it may be desired to have a plurality of TAs in a condition of the CA that a plurality of cells are aggregated, and in 3GPP Rel-11, considered to allocate the TA independently in a specific cell group unit for supporting multiple TA. It is referred to as TA group (TAG), the TAG may include one or more cell(s), and the same TA may be commonly applied in one more cell(s) that are included in the TAG. For supporting the multiple TA, the MAC TA command control element is configured with 2-bit TAG ID and 6-bit TAG command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, may be applied to all the cells within the pTAG. Meanwhile, in case of TAG (that is, secondary TAG (sTAG)) that is configured with SCells only, the TA, which is determined based on a specific SCell within sTAG, may be applied to all the cells within the relevant sTAG, and in this time, the TA may be acquired through the random access procedure by being initiated by the eNB. Particularly, the SCell in the sTAG is set to be RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using RA-RNTI. The TA that is determined based on SCell that successfully completes the random access may be applied to all the cells in the relevant sTAG by the UE. Like this, the random access procedure may be performed in SCell as well in order to acquire timing alignment of the sTAG to which the relevant SCell belongs.

The LTE/LTE-A system provides both of the contention-based random access procedure that the UE randomly selects to use one preamble in a specific set and the non-contention-based random access procedure that the eNB uses the random access preamble that is allocated to a specific UE. However, the non-contention-based random access procedure may be used only for the handover procedure previously described, specific case of being requested by the order of eNB, the UE positioning and/or the timing advance alignment for the sTAG. After the random access procedure is completed, a normal UL/DL transmission is made.

In the meantime, relay node (RN) also supports both of the contention-based random access procedure and the non-contention-based random access procedure. When the relay node performs the random access procedure, the RN suspends the subframe configuration at the moment. That is, it means that the RN subframe configuration is temporarily terminated. Then, the RN subframe configuration is reinitiated at the time when the random access procedure has been successfully completed.

FIG. 15 is a diagram for describing the contention-based random access procedure in the wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The random access preamble is transmitted by 6 bits in the RACH transmission channel, and the 6-bit consists of 5-bit random identity for identifying the RACH transmitted UE and the rest 1-bit (for example, indicating the size of msg 3) for representing additional information.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the relevant UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary C-RNTI (TC-RNTI), and time alignment command (TAC). The TAC is the information indicating a time synchronization value that is transmitted by the eNB in order to maintain the UL time alignment. The UE updates the UL transmission timing using the time synchronization value. On the update of the time synchronization value, the UE initiates or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC PDU and the MAC PDU may be delivered through PDSCH. It is desirable to include the information of UE that is to receive the PDSCH, frequency and the time information of the PDSCH radio resource, and transmission type of the PDSCH, etc in the PDCCH. As described above, if succeeding in detecting the PDCCH that is transmitted to the UE itself, the UE may receive properly the random access response that is transmitted to the PDSCH according to the PDCCH information.

The random access response window represents the maximum time section when the UE that has transmitted the preamble is waiting for the random access response message. The random access response window has the length of 'ra-ResponseWindowSize', which starts from the subframe after 3 subframes from the last subframe in which the preamble is transmitted. That is, the UE is waiting for receiving the random access response during the random access window secured after 3 subframes from the subframe in which the preamble transmission is completed. The UE may acquire the random access window size ('ra-ResponseWindowsize') parameter value through the system information, and the random access window size may be determined as a value from 2 to 10.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

As described above, the reason why the random access preamble index is needed in the random access response is that one random access response may include the random access response information for one or more UEs, and so there is required an index to instruct for which UE the above UL grant, TC-RNTI, and TAC are available.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB. In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. In the content based random access procedure, the eNB may not identify which UEs perform the random access procedure, but the eNB is required to identify the UE in order to solve the collision later on.

There are two ways how to include the identifier of UE. The first method is that the UE transmits the C-RNTI of its own through the UL transmission signal corresponding to the UL grant, if the UE has a valid C-RNTI that is already allocated by the relevant cell before the random access procedure. Meanwhile, if the UE has not been allocated a valid C-RNTI before the random access procedure, the UE transmits including unique identifier of its own (for example, S-TMSI or random number). Normally the above unique identifier is longer than C-RNTI. For the transmission on the UL SCH, the UE-specific scrambling is used. However, if the UE has not been allocated C-RNTI yet, the scrambling is not based on the C-RNTI but uses TC-RNTI that is received from the random access response instead. If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the relevant UE. Herein, the 4 message may correspond to the RRC connection setup message including C-RNTI.

The UE waits for the instruction of eNB in order to resolve contention after transmitting the data including the identifier of its own through the UL grant included the random access response. That is, the UE attempts the receipt of PDCCH in order to a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure has been completed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a random access procedure has been completed. The UE acquires C-RNTI through the 4 message, and after that, the UE and network are to transmit and receive a UE-specific message by using the C-RNTI.

The following is a description of the way how to resolve a collision in the random access.

The reason why a collision is occurred in performing the random access is that the number of random access preamble is limited basically. That is, it is not available that the eNB assigns a unique random access preamble for the UE to all the UEs, and the UE should randomly select one among the common random access preambles and transmit. According to this, a case is occurred that two or more UEs select the identical random access preamble through the identical radio resource (PRACH resource) and transmit, but the eNB recognizes it as one random access preamble that is transmitted from one UE. Accordingly, the eNB transmits the random access response to the UE and expects that the random access response is supposed to be received by one UE. However, as described above, as there is a possibility that a collision is occurred, two or more UEs are going to receive one random access response, and according to this, each UE performs an operation by the receipt of random access response. That is, there is a problem that two or more UEs transmit different data to the same radio resource by using one UL grant included in the random access response. According to this, the data transmission might be all failed, and depending on the location of UEs or transmission power, the data of a specific UE only may be received by the eNB. In the latter case, as all of the two or more UEs assume that the data transmission of its own are succeeded, the eNB should inform the fact to the relevant UEs that they are failed in contention. That is, what to inform the fact of the failure or success in contention is referred to as contention resolution.

There are two ways of contention resolution. The one is to use the contention resolution timer, and the other is to transmit the identifier of successful UE to UEs. The former is applied to the case that the UE already has a unique C-RNTI before the random access procedure. That is, the UE that already has the C-RNTI transmits the data including the C-RNTI of itself according to the random access response and operates the contention resolution timer. And if the PDCCH information that is addressed by the C-RNTI of its own is received before the contention resolution timer is terminated, the UE judges itself to succeed in the contention and normally terminates the random access. In the contrary, if the PDCCH information that is addressed by the C-RNTI of its own is not received before the contention resolution timer is terminated, the UE judges itself to fail in the contention and renews the random access procedure, or informs the fact of failure to the higher layer. In the latter case of the ways of contention resolution, that is, the case that is to transmit the identifier of successful UE, is used for what the UE does not have a unique C-RNTI before the random access procedure. That is, in case that the UE itself does not have C-RNTI, the UE transmits including a higher identifier (S-TMSI or random number) more than the C-RNTI of data according to the UL Grant included in the random access response, and operates the contention resolution timer. In case that the data including the higher identifier of its own is transmitted to DL-SCH before the contention resolution timer is terminated, the UE judges that the random access procedure is successful. On the other hand, in case that the data including the higher identifier of its own is not transmitted to DL-SCH before the contention resolution timer is terminated, the UE judges that the random access procedure is failed.

Meanwhile, the operation of the non-contention-based random access procedure, unlike the contention-based random access procedure illustrated in FIG. 15, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

FIG. 16 is a diagram for describing the non-contention-based random access procedure in the wireless communication system to which the present invention can be applied.

(1) The Allocation of the Random Access Preamble

As described above, the non-contention-based random access procedure may be performed in order for (1) the case of handover procedure, (2) the case of being requested by the eNB command, or (3) the UE positioning and/or the timing advance alignment for sTAG. Of course, the contention-based random access procedure may be performed for the cases mentioned above.

First, it is important to receive the random access preamble that is designated and has not possibility of collision for the non-contention-based random access procedure. In case that the eNB allocates a specific random access preamble to a specific UE, the random access preamble used the relevant specific UE only and the other UEs don't use the random access preamble, and so there is not occurred a collision with other UEs. The way how to take instruction of the random access preamble is to use the handover command and PDCCH command. The UE is allocated with the random access preamble through this.

(2) Message 1 (Msg 1)

The UE, as described above, is allocated the random access preamble designated to itself and transmits the allocated preamble to the eNB.

(3) Message 2 (Msg 2)

The way how to receive the random access response information is similar to the contention-based random access procedure described above. That is, the UE transmits the random access preamble and then, attempts to receive the random access response of its own within the random access response window instructed by through system information or handover command by the eNB. Through this, it is available to receive UL grant, temporary C-RNTI and TAC and so on.

In the non-contention-based random access procedure, the random access procedure may be terminated judging that the random access procedure is normally completed by receiving the random access response information.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 17 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 17(a) exemplifies a UL resource allocation procedure for actual data in case that the UL radio resources for the buffer status reporting (BSR) are not allocated to a UE. That is, for a UE that transits a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 17(a), the case that the PUSCH resource for transmitting the BSR is not allocated to a UE is illustrated. The UE transmits the scheduling request (SR) to an eNB first in order to be allocated with the PUSCH resources (S1701).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (S1703), the UE transmits the BSR triggered through the PUSCH resources which are allocated by the UL grant (S1705).

The eNB verifies the quality of data that the UE actually transmit to the UL through the BSR, and transmits the UL grant for the PUSCH resources for actual data transmission to the UE (S1707). The UE that receives the UL grant for actual data transmission transmits the actual UL data to the eNB through the PUSCH resources (S1709).

FIG. 17(b) exemplifies the UL resource allocation procedure for actual data in case that the UL radio resources for the BSR are allocated to a UE.

Referring to FIG. 17(b), the case that the PUSCH resources for BSR transmission are already allocated to a UE is illustrated. In the case, the UE transmits the BSR through the allocated PUSCH resources, and transmits a scheduling request to an eNB (S1711). Then, the eNB verifies the quality of data to be transmitted to the UL by the UE through the BSR, and transmits the UL grant for the PUSCH resources for actual data transmission to the UE (S1713). The UE that receives the UL grant for actual data transmission transmits the actual UL data to the eNB through the allocated PUSCH resources (S1715).

Definition and Configuring Method of Contention-based Radio Resources

FIG. 18 is a diagram for describing a latency taken for each contention-based random access procedure required in 3GPP LTE-A system to which the present application can be applied.

In FIG. 18, the random access procedure of 4 steps (contention-based random access) described in FIG. 15 is exemplified. In LTE-A system, based on the random access procedure of 4 steps for an initial network access, the latency represented in Table 10 below is required.

Table 10 represents the latency in contention-based random access which is required in LTE-A system.

TABLE 10

| Procedure | Description | Time (ms) |
|---|---|---|
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE's reception of scheduling grant and timing adjustment) | 3 |
| 5 | UE Processing Delay (decoding of scheduling grant, timing alignment and C-RNTI assignment + L1 encoding of RRC Connection Request) | 5 |
| 6 | Transmission of RRC and NAS Request | 1 |
| 7 | Processing delay in eNB (L2 and RRC) | 4 |
| 8 | Transmission of RRC Connection Set-up (and UL grant) | 1 |
| | Total delay | 15.5 |

Referring to FIG. 18 and Table 10, as an average delay due to a RACH scheduling duration that has a RACH cycle of 1 ms, 0.5 ms is required, and 1 ms is required to transmit a random access preamble (RACH preamble) and to be arrived at an eNB. As a time required for detecting the preamble in the eNB and transmitting the random access response, that is, from an end time of a RACH transmission and until receiving a scheduling grant and a timing adjustment, 3 ms is required. 5 ms is required for L1 layer encoding of the scheduling grant, the timing adjustment and the RRC connection request by a UE and a processing delay in a UE such as a C-RNTI assignment. And 1 ms is required for transmitting the RRC and NAS request, and 4 ms is required for a processing delay in L2 and the RRC layer of an eNB. And 1 ms is required for transmitting an RRC connection establishment (and UL grant) by an eNB. As such, total 15.5 ms is required for completing contention-based random access procedure.

As described above, the UE in a state before being connected with network should perform 4 steps of the random access procedure in order to be allocated with UL resources required to transmit the RRC/NAS request message for transmitting its information, and this causes to increase the latency in the procedure.

FIG. 19 is a diagram for describing a latency taken in C-plane required in 3GPP LTE-A system to which the present invention can be applied.

Referring to FIG. 19, 3GPP LTE-A requires a transition time from an idle mode (a state that IP address is allocated) to a connected mode to be less than 50 ms. In this time, the transition time includes a configuration time (except latency for transmitting S1) in a user plane (U-plane). In addition, a transition time from a dormant state to an active state in the connection mode is requested to be less than 10 ms.

The transition from the dormant state to the active state may occur in 4 scenarios as follows.

Uplink initiated transition, synchronized
Uplink initiated transition, unsynchronized
Downlink initiated transition, synchronized
Downlink initiated transition, unsynchronized FIG. 20 is a diagram for describing a transition time from the dormant state to the active state for a synchronized UE required in 3GPP LTE-A to which the present invention can be applied.

In FIG. 20, the UL resource allocation procedure of 3 steps (in case of UL radio resources for the BSR are allocated) described in FIG. 17 above is illustrated. In LTE-A system, the latency is required for UL resource allocation as represented in Table 11 below.

Table 11 represents a transition time from the dormant state to the active state initiated by a UL transmission, in case of a synchronized UE which is required in LTE-A system.

TABLE 11

| Component | Description | Time [ms] |
|---|---|---|
| 1 | Average delay to next SR opportunity (1 ms/5 ms PUCCH cycle) | 0.5/2.5 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
| | Total delay | 9.5/11.5 |

Referring to FIG. 20 and Table 11, as an average delay due to a RACH scheduling duration that has a RACH cycle of 1 ms/5 ms, 0.5 ms/2.5 ms is required, and 1 ms is required for a UE to transmit the SR. And 3 ms is required for an eNB to decode the SR and generate the scheduling grant, and 1 ms is required to transmit the scheduling grant. And 3 ms is required for a UE to decode the scheduling grant and encode the UL data in L1 layer, and 1 ms is required to transmit the UL data.

As such, total 9.5/15.5 ms are required for a UE to complete a procedure of transmitting the UL data.

Table 12 below represents a UL resources allocation procedure of 5 steps (in case that UL radio resources for the BSR is not allocated) described in FIG. 17. In LTE-A system, the latency as represented in Table 12 below is required for the UL resource allocation.

TABLE 12

| Component | Description | Time [ms] |
|---|---|---|
| 1 | Average delay to next SR opportunity (1 ms/5 ms PUCCH cycle) | 0.5/2.5 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of BSR | 1 |
| 7 | eNB decodes BSR and generates the Scheduling Grant | 3 |
| 8 | Transmission of Scheduling Grant | 1 |
| 9 | UE Processing Delay (decoding of scheduling grant + L1 encoding of UL data) | 3 |
| 10 | Transmission of actual data | 1 |
|  | Total delay | 17.5/19.5 |

Referring to Table 12, as an average delay due to a RACH scheduling duration that has a RACH cycle of 1 ms/5 ms, 0.5 ms/2.5 ms is required, and 1 ms is required for a UE to transmit the SR. And 3 ms is required for an eNB to decode the SR and generate the scheduling grant, and 1 ms is required to transmit the scheduling grant. And 3 ms is required for a UE to decode the scheduling grant and encode the UL data in L1 layer, and 1 ms is required to transmit the BSR. And 3 ms is required to decode the BSR in an eNB and generate the scheduling grant, and 1 ms is required to transmit the scheduling grant. And 3 ms is required to decode the scheduling grant by a UE and encode the UL data in L1 layer, and 1 ms is required to transmit the UL data.

As such, total 17.5/19.5 ms are required for a UE to complete a procedure of transmitting the UL data.

Accordingly, due to system characteristics of transmitting data based on scheduling by an eNB, the problem of increasing the latency even in case of transmitting UL data of a UE.

Particularly, in case of an application in which uplink data is generated intermittently (e.g., a health care, a traffic safety, etc.) or an application in which fast transmission is required, such a data transmission method is not proper since it causes the latency inevitably.

In LTE/LTE-A system, a semi-persistent scheduling (SPS) is defined for a voice over internet protocol (VoIP).

But, in the semi-persistent scheduling, a scheduling grant is configured, which is pre-defined by the RRC signaling for the UL and/or DL data. As such, when the SPS is configured, a UE may transmit or receive the UL/DL traffic on a pre-defined occasion or without a separate scheduling grant.

Like this, even in case of the SPS that is supported by current LTE/LTE-A system, it is permitted to transmit data only in a predetermined resource based on a pre-defined grant in an eNB. Since a transmission method for very small data that may be generated in aperiodic is not defined, the data should be transmitted through the UL resource allocation of 5 steps in case that the data of small size are intermittently generated. Since the UL resource allocation of 5 steps inevitably causes the latency, the UL resource allocation procedure of 5 steps or the SPS is not proper in case of an application that requires an intermittent data transmission or fast data transmission.

Following the development various applications (e.g., a health care, a traffic safety, a telepresence, a remote machine control, etc.) in the future, the data transmission method should be diversified to cope with such various applications. However, the current technology has not reflected this.

According to this, the present invention proposes to occupy the UL resource allocation of a UE in contention-based manner in order to minimize a procedure delay of the UE in 5 generation (5G) wideband wireless communication system. In other word, in order to minimize the latency in control plane of a UE such as an SR transmission, a UL grant transmission, and the like and to minimize the latency in an initial access procedure, a contention-based PUSCH zone is proposed.

If there are UL data that require low latency, a UE located in a cell in which the zone proposed in the present invention is configured may transmit data to an eNB using the corresponding zone without scheduling of the eNB.

The zone proposed in the present invention may be configured in a cell that serves a specific eNB, and may be used for the UL data that the UE belonged to the corresponding cell. But not limited to this, and also may be limitedly used only for the UL data which is to be transmitted by a specific UE, a specific service or within a specific procedure. For example, this may be limitedly used only for the UL data which are to be transmitted in an M2M UE that should quickly transmit data when generated although the data transmission is not frequently generated or in a UE used for a health care service. In addition, in 3GPP LTE/LTE-A, a UE is classified into a plurality of categories according to a performance of UE such as a maximum peak data rate and a multi-input multi-output (MIMO) transmission capacity, etc (refer to 3GPP TS 36.306), and the contention-based PUSCH zone may be used only for a UE that belongs to a specific category. Additionally, it may also be limitedly used for a service that requires fast data transmission such as an emergency call or a specific service that is required to provide a seamless service. In addition, it may also be limitedly used only UL data transmitted in a specific procedure such as an RRC/NAS request message in a random access procedure or a BSR message in a UL resource allocation procedure.

FIG. 21 illustrates an example of a contention-based radio resource configuration according to an embodiment of the present invention.

In the present invention, contention-based PUSCH zones (hereinafter, referred to as a 'CP zone') (2101, 2103) signify resource regions in which a contention-based UL data transmission allocated within a subframe is available. That is, the zones signify a region in which a UE may transmit UL data competitively without UL resource allocation scheduling of an eNB for the UL data transmission of a UE. The CP zones (2101, 2103) may be setup to a specific resource region on a PUSCH region in which UL data can be transmitted. The CP zones (2101, 2103) may be configured to be comprised of the same pattern within n (n>=1) subframes (or m (m>=1) radio frames). Also, the CP zones (2101, 2103) may be setup only a part of UL subframes considering resource utilization.

Each of the CP zones (2101, 2103) may include N contention-based PUSCH resource blocks (hereinafter, referred to as 'CPRB') (2105) that may occupy one or more UE(s). The CPRB (2105) signifies a UL resource region that a UE may occupy (e.g., use) for a specific procedure within the CP zone. Each of the CPRBs that constructs the CP zone has its own unique index (e.g., CPRB #1, CPRB #2, etc.), and the CPRB indexes may be configured in ascending/descending order in a time domain or may be configured in ascending/descending order in a frequency domain. In addition, the CPRB indexes may be configured by combining ascending/descending order in a time domain and a frequency domain. For example, in the lowest frequency domain of the CP zone, the CPRB indexes are given in ascending order in a time domain, and the CPRB indexes may be given in the next lowest frequency domain in ascending order in a time domain. Such CPRB index information may be transmitted to a UE with being included in a master information block (MIB) or a system information block (SIB). Also, indexes are given by a rule predefined between an eNB and a UE, and the UE may inherently know each CPRB index.

When a UE uses the CPRB, one UE may uses one or more CPRB (2105) according to a quality of UL data that the UE is going to transmit, a procedure performed by the UE to transmit the UL data, a service that the UE to transmit the UL data is using, and the like. Herein, different number of CPRBs may be used for each of UEs. For example, in case that there are N CPRBs that construct the CP zone, one CPRB may be used for each UE such that UE 1 uses CPRB #1, UE 2 uses CPRB #2, and UE 3 uses CPRB #3. Or, one UE may use a plurality of CPRBs such that UE 1 uses CPRB #1, CPRB #2 and CPRB #3, and the number of CPRB used by a UE may be different. Or, different UEs may share and use an identical CPRB (2105) such that both of UE 1 and UE 2 use CPRB #1.

Each UE may use the CPRB competitively, and the CPRB may be allocated to each UE that requests a desired CPRB to an eNB, in case that the CPRB is allocated to each UE by the eNB or the UE receives CPRB related information of the CP zone from the eNB. When allocating CPRB to each of UEs in an eNB, the eNB may map the UE that enters a cell and the CPRB in 1:1 manner, in case of a small cell in which the number of UE (or the number of user) that may be accommodated in a cell. As an example, if the maximum number of UE that can be accommodated in a small cell are N, an eNB (secondary eNB) of the small cell allocates the CP zone for N UEs and does not permit to enter cell for UEs that exceed N. In addition, a macro eNB that includes a coverage of small cell exchanges information with an eNB of the small cell through a backhaul interface, and the macro eNB may also allocate a CPRB which is usable in the small cell to a UE in case that the UE having connection with the macro eNB adds the connection with the eNB of the small cell through a dual connectivity. Herein, the dual connectivity signifies an operation that the UE uses radio resources which are provided by at least two different network points (e.g., a macro eNB and a secondary eNB) which are connected by non-ideal backhaul.

In addition, the CP zones (2101, 2103) may be configured with being distinguished for each procedure, and the CP zones (2101, 2103) for different procedures may be configured in the same or different regions in different regions within a subframe or between subframes. FIG. 21 illustrates that each of the CP zone (UL contention zone) (2101) for RACH and the CP zone (UL contention zone) (2103) for other procedures except the RACH is configured. As such, in case the CP zone is configured with being distinguished by each procedure, a location of the zone, a size of the zone or a shape of the zone, each configured for procedure may be differently configured. The fact that each size of the CP zones (2101, 2103) are differently configured signifies that the number of CPRBs (2105) that configure the CP zone (2101, 2103) is different. FIG. 21 illustrates that the CP zone (2101) for the RACH is configured to two CPRBs (2105) in a time domain and to 3 CPRBs (2105) in a frequency domain, and comprised of total six CPRBs (2105). On the contrary, it is illustrated that the CP zone (2103) for different procedures except the RACH is comprised of one CPRB (2105) within a slot in a time domain, the shape of zone is different from the CP zone (2101) for the RACH.

A contention-based PUSCH group (hereinafter, referred to as 'CP group') (2107) may be comprised of one or more CP zone(s) (2101), and signifies a resource region in which the UEs that occupy the CPRB resources may contend in an arbitrary time, that is, a set of candidate CPRB(s) that an arbitrary UE may occupy. Like the CP zone (2103) for different procedure except the RACH, it is also possible to configure the CP group (2107) using one CP zone (2103). In this case, the CP zone and the CP group have the same region in case of being configured.

In the specification, the concept that embraces of the CP zone, the CPRB and CP group described above will be referred to as a 'contention-based radio resource'.

In case that a UE performs a random access procedure (RACH procedure) using the CP zone, the UE may transmit the RRC message to an eNB together with a RACH preamble sequence or sequentially through the CP zone.

That is, in case of the RACH procedure based on the CP zone according to the present invention, a UE may transmit the RACH preamble message and the RRC message using the same time or a continuous time resource to an eNB, which is different from a general RACH procedure of transmitting the RRC message only in case of receiving a UL grant through a random access response message after transmitting the RACH preamble sequence. Herein, the same time resource signifies a radio resource in the same subframe, and the continuous time resource signifies a radio resource in a subframe next to the subframe in which the RACH preamble is transmitted.

The CP zone defined in the present invention may be configured with an intra-subframe or an inter-subframe scheme in a relation to a PRACH region in which the RACH preamble is transmitted, and two schemes may be coexisted and configured. This will be described in detail with reference to FIG. 22.

FIG. 22 illustrates an example of a contention-based radio resource configuration according to an embodiment of the present invention.

FIG. 22(*a*) illustrates the intra-subframe scheme. In the intra-subframe configuration scheme, the CP zone is divided into a PRACH region and different time resources (time division multiplexing; TDM) or divided into frequency resources (frequency division multiplexing; FDM) within the same subframe.

FIG. 22(*b*) illustrates the inter-subframe scheme. In the inter-subframe configuration scheme, the CP zone is divided by different TTIs and allocated through subframe resources adjacent to the PRACH resource region.

FIG. 22(*c*) illustrates a scheme in which the intra-subframe scheme and the inter-subframe scheme are coexisted. In the coexisted scheme, the CP zone is allocated with being divided into different time resources or different frequency resource to one PRACH region, and allocated with being divided into different TTIs to another PRACH region through an adjacent subframe resource. In addition, in order to maximize the resource utilization in a cell, the PRACH resource region or the CP zone may not be configured in a specific subframe.

The resource region configuration scheme may be determined by various methods according to a cell operating method as well as the schemes of FIG. 22(*a*) to FIG. 22(*c*) described above.

Meanwhile, in FIG. 22, a radio frame of type 1 which is applicable to the FDD in 3GPP LTE/LTE-A standard is assumed and exemplified, but the CP zone, the CPRB and the CP group may be configured in the same manner in a radio subframe of type 2 which is applicable to the TDD.

The CP zone, the CPRB and the CP group described above are predefined in a specific cell, an eNB of the corresponding cell transmits the configuration information for the contention-based radio resource to a UE in order to notify that the contention-based radio resource is configured. Herein, the above specific cell may signify a small cell such as a femto cell, a pico cell and a micro cell or a macro cell.

The configuration information for the contention-based radio resource may include the UL resource information in which the CP zone is configured and the information required to transmit data that may be transmitted through the CPRB configured in the CP zone. In addition, the configuration information for the contention-based radio resource may include the information that represents whether the contention-based radio resource is configured or not, and the information that represents whether the contention-based radio resource or not may be transmitted separately to the UE.

The UL resource information in which the CP zone is configured signifies the information for time/frequency resource domain in which the CP zone is configured. In addition, since the CP zone may be configured only to a part of UL subframe considering the resource utilization, in this case, the information on whether the subframe is configured or not be included.

Also, a value that represents the number (N) of CPRBs constructing one CP zone which is configured and a value that represents the number (M) of CP zones that attempt to occupy resources by an arbitrary UE on a specific timing may be included. Herein, N*M signifies a number of CPRBs that an arbitrary UE may select on a specific timing. For example, in case that one CP zone is comprised of four CPRBs, and one CP group is comprised of two CP zones, a UE has candidate CPRBs as many as N*M=8.

A maximum resource block size per UE, a modulation and coding scheme (MCS) level, an initial transmission power reference, and the like may correspond to the information required to transmit data which may be transmitted through the configured CPRB.

The configuration information of the contention-based radio resource may be transmitted with a broadcasting message, transmitted with a unicast message for a specific UE, or transmitted with a multicast message for one or more UE group(s).

The configuration information of the contention-based radio resource may be transmitted to a UE through a master information block (MIB). The configuration information of the contention-based radio resource may be included in the MIB that transmits information of essential physical layer.

Additionally, the configuration information of the contention-based radio resource may be transmitted to a UE through the existing system information block (SIB)-x. The case of being transmitted through the SIB-x is the case in which the CP zone is configured for an initial network access, and the configuration information of the contention-based radio resource may be transmitted with being included in the SIB-2. For example, in case that the CP zone is configured for the RACH procedure, a UE pre-recognizes that it may access to a cell through the RACH procedure based on the CP zone before the UE accesses the cell, by adding information for the CP zone in the SIB-2.

Also, new SIB-y may be defined as well as the existing SIB-x, and through this, the configuration information of the contention-based radio resource may be transmitted to a UE. That is, in case that the CP zone is configured for the procedure after network access, the configuration information of the contention-based radio resource may be transmitted through the new SIB definition. Herein, an eNB may transmit an indication that notifies the newly defined SIB information to be a cell with being included in the MIB, the SIB-1 or the SIB-2 to a UE.

In addition, the configuration information of the contention-based radio resource may be transmitted to a specific UE using a unicast scheme through a new control message. In case that a UE is connected to a cell, by transmitting the configuration information of the contention-based radio resource only to the UE that is required to use the CP zone through the unicast scheme, the configuration information of the contention-based radio resource may be received by a specific UE. In case that a UE accesses (or enters) to a cell, by transmitting the information that notifies a use of the CP zone to an eNB when accessing cell, the eNB may transmit the configuration information of the contention-based radio resource to the UE through a unicast message.

Hereinafter, a method of using the CP zone in the RACH procedure and the UL resource allocation procedure will be described with reference to FIG. 23 and FIG. 24.

First, a method of using the CP zone in the RACH procedure will be described.

In case of using the CP zone in the RACH procedure, a UE may use the CP zone as a UL resource for transmitting an RRC message and/or a NAS message. That is, in case of the contention-based random access procedure, the CP zone may be used for transmitting a third message (e.g., an RRC connection request message). In addition, in case of non-contention-based random access procedure, the CP zone may be used as a UL resource for transmitting an RRC message after completing the RACH procedure.

The RRC message transmitted through the CP zone may correspond to one of the followings depending on a RACH procedure which is performed.

1. In case of performing the RACH procedure for an initial access, the RRC message transmitted through the CP zone may correspond to an RRC connection request message.

2. In case of performing the RACH procedure for a handover (HO), the RRC message transmitted through the CP zone may correspond to an RRC connection reconfiguration complete message.

3. In case of performing the RACH procedure for an RRC connection re-establishment, the RRC message transmitted through the CP zone may correspond to an RRC connection re-establishment request message.

FIG. 23 illustrates a random access procedure using the contention-based radio resource according to an embodiment of the present invention.

FIG. 23(a) illustrates an example of using the contention-based radio resource in the contention-based random access procedure, and FIG. 23(b) illustrates an example of using the contention-based radio resource in the non-contention-based random access procedure.

Referring to FIG. 23(a), a UE transmits a RACH preamble sequence through the PRACH, and simultaneously or sequentially transmits an RRC message to an eNB through the CP zone (particularly, through the CPRB of the CP zone) (S2301). Herein, the RRC message may correspond to the RRC connection request message or the RRC connection re-establishment request message.

The eNB transmits a contention resolution as an RRC response message to the UE (S2303).

As such, the UE transmits the RRC message from the eNB through the CP zone without separate UL grant, and receives the UL grant from the eNB. Through this, there is an effect to shorten the time for transmitting the RRC message. In other word, the UE performs the contention-based random access procedure through the CP zone, thus, two steps of RACH procedure may be performed by transmitting the message 3 and the RACH preamble sequence simultaneously or sequentially.

Referring to FIG. 23(b), after a UE is allocated with the RACH preamble sequence from an eNB (S2305), the UE transmits the allocated RACH preamble sequence and the RRC message simultaneously or sequentially to the eNB (S2307). Herein, the allocated RACH preamble sequence is transmitted through the PRACH, and the RRC message is transmitted to the eNB through the CPRB of the CP zone. Herein, the RRC message may correspond to an RRC connection re-configuration completion message.

The eNB transmits a random access response message to the UE in response to the random access (S2309).

As such, in case of transmitting the RRC message through the CP zone, by transmitting the RRC message, which could be transmitted after the RACH procedure, while performing the RACH procedure simultaneously, the overall RRC procedure (e.g., performing handover) can be more quickly performed.

Meanwhile, in FIG. 23(a) and FIG. 23(b) above, the UE may omit to transmit the RACH preamble to the eNB. That is, the UE may omit to transmit the RACH preamble if the UE acquires the timing alignment (TA) value for the UL synchronization from the eNB through the DL data reception in advance in the RACH procedure. For example, the UE may acquire the TA value in advance by using a global positioning system (GPS) or acquiring a time difference value from the eNB in advance.

As such, in case that the RACH preamble transmission of the UE is omitted, the UE performs the RACH procedure by transmitting only the RRC message to the eNB through the CPRB in step S2301 of FIG. 23(a) and step S2307 of FIG. 23(b). As a result, in case of using the CP zone for the RACH procedure, the RACH procedure is different from a general RACH procedure that does not use the CP zone as follows.

The contention-based random access procedure: RACH procedure of 4 steps->RACH procedure of 2 steps The non-contention-based random access procedure: RACH procedure of 3 steps+RRC message transmission->RACH procedure of 3 steps including the RRC message transmission.

As described above, when performing the RACH procedure of 2 steps, the existing random access procedure of 4 steps may be decreased to 2 steps, thereby minimizing overall latency in an initial access procedure.

This has an effect of decreasing a delay of the initial random access procedure to minimum 6.5 ms, which was 15.5 ms (refer to FIG. 18 above) conventionally, in case that the preamble and the CP zone coexist within the same TTI.

Next, a method of utilizing the CP zone in a UL resource allocation procedure will be described.

As described in FIG. 17, as a UL resource allocation method based on general eNB scheduling which is not utilizing the CP zone, there are UL resource allocation procedure of 5 steps and UL resource allocation procedure of 3 steps.

The UL resource allocation procedure of 5 steps is made up of 5 steps of procedure: a UE request a UL scheduling to an eNB, and the eNB transmits a UL grant for the BSR, and through this, the UE transmit the BSR to the eNB. Later, the eNB transmits the UL grant for actual data transmission of the UE, and the UE transmits the actual data to the eNB through the UL grant.

Also, the UL resource allocation procedure of 3 steps is made up of 3 steps of procedure: a UE transmits a UL scheduling request and the BSR simultaneously to an eNB, and the eNB transmits a UL grant for actual data transmission of the UE to the UE. Later, the UE transmits the actual data to the eNB through the UL grant.

In the UL resource allocation procedure based on an eNB scheduling using the CP zone, the UL resource allocation procedure of 5 steps is changed to 3 steps, and the 3 steps is changed to 1 step, as shown in FIG. 24.

FIG. 24 illustrates a UL resource allocation procedure using a contention-based radio resource according to an embodiment of the present invention.

FIG. 24(a) illustrates an example of UL resource allocation procedure using a contention-based radio resource (3 steps), and FIG. 24(b) illustrates an example of UL resource allocation procedure using a contention-based radio resource (1 step).

Referring to FIG. 24(a), in the UL resource allocation procedure of 3 steps based on an eNB scheduling using the CP zone, a UE does not receive a UL grant for the BSR from an eNB, but the UE transmits the BSR through the CP zone (S2403).

Later, the UE receives the UL grant for actual data transmission from the eNB (S2405) and the UE transmits the actual data to the eNB using the received UL grant (S2407).

Referring to FIG. 24(b), a UE may transmit the BSR together with actual data to an eNB using the CP zone (S2411).

Accordingly, in case of performing the UL resource allocation procedure using the CP zone, the general UL resource allocation procedure of 5 steps changed to the UL resource allocation procedure of 3 steps, and the general UL resource allocation procedure of 3 steps changed to the UL resource allocation procedure of 1 step.

Herein, in order to perform the UL resource allocation procedure (3 steps and 1 step) using the CP zone, first, an eNB may transmit the configuration information for the contention-based radio resource described above (S2401 and S2409). It may be preferable that the configuration information for the contention-based radio resource is transmitted through the SIB since the configuration information for the contention-based radio resource is system related information, but not limited thereto, and may be transmitted in various methods.

As described above, in case of performing the UL resource allocation procedure using the CP zone, the time for a UE to request the UL resources to an eNB and for being allocated with the UL resources from the eNB can be decreased. Accordingly, there is an effect of decreasing overall procedure latency in comparison with a general UL resource allocation procedure based on eNB scheduling.

UL Data Transmission Method

Hereinafter, the present invention proposes a scheduling request method for quickly performing data transmission of a UE using the contention-based radio resources described above, in case that UL data that the UE is going to transmit are generated from an application which is sensitive to delay, or in case of transmitting data of small size intermittently/aperiodic ally.

FIG. 25 illustrates a UL data transmission method according to an embodiment of the present invention.

Referring to FIG. 25, a UE transmits a uplink scheduling request (UL SR) for UL data and/or the BSR through PUCCH resources (S2501), and transmits actual UL data and/or the BSR (if necessary) together with the UL SR in a first TTI through the contention-based PUSCH resource block (CPRB) in the same TTI (S2503).

That is, the UE may transmit the UL SR and the UL data in the first TTI. In addition, the UE may transmit the UL SR, the UL data and the BSR in the first TTI. Additionally, the UE may transmit the UL SR and the BSR in the first TTI.

According to the conventional method, 4 ms is required until a UE receives a UL grant for the BSR from an eNB after transmitting the UL SR. And, 4 ms is required until transmitting the BSR to the eNB after the UE receives the UL grant. And, 4 ms is required until receiving actual UL data after the UE transmit the BSR. And, 4 ms is required until transmitting the actual UL data after the UE receives the UL grant.

Since the SR transmission periodicity is configured in a range of 1 ms to 80 ms, delay of 1 ms to 80 ms may occur until actual data transmission which is initially transmitted after being transited from a DRX mode to an active mode. However, according to the conventional UL data transmission method, even if the latency for the SR periodicity is excluded, delay of total 16 ms occurs as described above. Since the actual UL data are transmitted in the TTI in which the UL SR according to the present invention is transmitted together, the above delay of 16 ms may be decreased (8 ms, in case that the UL SR and the BSR are transmitted in the first TTI).

In the scheduling request method proposed in the present invention, the contention-based PUSCH zone (CP zone) may be used as a UL resource for actual data transmission, and a method of transmitting the UL data in one step is proposed by simultaneously transmitting the SR (or without the UL grant from the eNB) in the step of transmitting actual data which is initially transmitted after being transited from the DRX mode to the active mode.

Therefore, according to the present invention, a time required for initial actual UL data transmission becomes identical to the SR transmission periodicity (1 ms to 80 ms).

FIG. 26 illustrates a UL data transmission method according to an embodiment of the present invention.

Referring to FIG. 26(a), a UE transmits a UL scheduling request (UL SR) through a PUCCH resource (S2601).

And, the UE transmits actual UL data in an identical TTI (e.g., an identical subframe) to the PUCCH resource in which the UL SR is transmitted through the contention-based radio resource block (CPRS) (S2603).

The PUCCH resource for one UE is allocated to an RB pair in one subframe, and a PUCCH resource index is configured by UL-specific higher layer signaling. As described above, the PUCCH resource index is mapped to a combination of a physical resource block (PRB), a cyclic shift (CS) applied to the frequency domain and an orthogonal cover code (OCC) applied to the time domain. That is, the PUCCH resource index specifies the combination of different PRB, CS and OCC.

The CPRB may be determined from any one of one or more contention-based radio resource blocks (CPRBs) included in the contention-based PUSCH zone (CP zone) which is set to the same TTI as the PUCCH resource that transmits the UL SR. For example, the CPRB may be determined by being mapped to the PUCCH resource index that a UE transmits the UL SR.

Herein, the UE may transmit the actual UL data through a plurality of CPRBs if necessary (e.g., if there are large amount of data).

The case of FIG. 26(a) may be suitable for transmitting data of small size (e.g., a health care, traffic safety information, etc.) which are intermittently/aperiodically generated.

Referring to FIG. 26(b), a UE transmits the UL SR through the PUCCH resource (S2605).

And, the UE transmits actual UL data in an identical TTI (e.g., an identical subframe) to the PUCCH resource in which the UL SR is transmitted through the contention-based radio resource block (CPRS) (S2607).

The PUCCH resource for one UE is allocated to an RB pair in one subframe, and a PUCCH resource index may be configured by UE-specific higher layer signaling. As described above, the PUCCH resource index is mapped to a combination of a physical resource block (PRB), a cyclic shift (CS) applied to the frequency domain and an orthogonal cover code (OCC) applied to the time domain. That is, the PUCCH resource index specifies the combination of different PRB, CS and OCC.

The CPRB may be determined from any one of one or more CPRBs included in the CP zone which is set to the same TTI as the PUCCH resource that transmits the UL SR. For example, the CPRB may be determined by being mapped to the PUCCH resource index that a UE transmits the UL SR.

Herein, the UE may transmit the actual UL data through a plurality of CPRBs if necessary (e.g., if there are large amount of data).

The UE receives UL data which are going to transmit next and a UL grant for the BSR (S2609).

Herein, the UL grant may allocate a predefined physical resource block (PRB) of fixed size (e.g., one PRB or two PRBs).

In addition, the UL grant may allocate a size of resource which is the same as the initial UL data that the UE transmits through the TTI which is the same as the UL SR in step S2605. For example, in case that the UE use one CPRB to transmit initial UL data, the UL grant may allocate one PRB to the UE. Also, in case that the UE use two CPRBs to transmit the initial UL data, the UL grant may allocate two PRBs to the UE.

The UE transmits the actual UL data and the BSR to the eNB through the PUSCH resource which is allocated by the UL grant (S2611).

Meanwhile, the UE may transmit the BSR together with the UL data through the CPRB if necessary, as illustrated in step S2607 of FIG. 24(b).

As such, in case that the UE transmits the BSR together with the UL data through the CPRB in step S2607, the UE may receive the UL grant for the UL data which are going to be transmitted next from the eNB in step S2609.

And, in step S2611, the UE transmits actual UL data to the eNB through the PUSCH resource which is allocated by the UL grant.

The procedure that the UE transmits the UL later may be identically progressed as the procedure that the existing UE transmits the UL data, as illustrated in FIG. 17 above.

The case of FIG. 26(b) may be suitable for transmitting data (e.g., video data, etc.), arrived at a buffer, generated from a delay sensitive application. For example, the initial data transmitted from the TTI in which the SR is transmitted may correspond to the initial frame data of video data.

The UL SR (S2601 and S2605) illustrated in FIG. 26 may include UL data characteristic information. That is, the UL SR (S2601 and S2605) may include the characteristic information for the UL data which are going to be transmitted in the same TTI (or the next subframe) with being mapped with the UL SR.

Herein, the UL data characteristic information specifies the information that represents service characteristics for the UL data that causes the SR and/or the transmission method for the SR. That is, the UL data characteristic information may indicate whether the UL data are transmitted through the CPRB. In addition, the UL data characteristic information may indicate attribute information of the UL data which are transmitted through the CPRB. The UL data characteristic information may be one of the followings.

1) Aperiodic Short Data (1-Step SR)

This signifies the case of FIG. 26(a) described above, and signifies the case that the UL data which are going to be transmitted with being mapped with the UL SR are the data of small size which are aperiodically/intermittently generated.

2) Delay Sensitive Long Data (1-Step SR)

This signifies the case of FIG. 26(b) described above, and signifies the case that the UL data which are going to be transmitted with being mapped with the UL SR are the data generated by an application which is sensitive to delay.

3) Normal Data (3-Step SR)

Like the case of FIG. 17(b) or FIG. 24(a) described above, this signifies the UL data which are going to be transmitted with being mapped with the UL SR in case that the BSR is transmitted in the TTI in which the UL SR is transmitted.

In this case, the BSR may be transmitted through the PUSCH resource allocated to a UE as shown in FIG. 17(b), or transmitted through the CPRB included in the same TTI through which the UL SR is transmitted as shown in FIG. 24(a).

4) Other Data (5-Step SR)

This signifies other UL data which are going to be transmitted according to the UL scheduling procedure of 5 steps, since the PUSCH resource for BSR is not allocated to a UE as shown in FIG. 17(a).

As such, in order to specify four cases, the SR in the present invention may be defined as the SR that includes information of 2 bits, and the PUCCH format for transmitting the SR information of 2 bits may be newly defined.

In addition, the SR PUCCH resource allocated to each UE may be newly defined such that the resource for 2 bits information may be allocated.

However, the characteristics of UL data is distinguished by four cases, this is for the convenience of description, but the present invention is not limited to the four cases.

Accordingly, the bit for SR information is not limited to 2 bits, and information of more than 2 bits may be transmitted.

As such, the information representing service characteristics for the data that causes the SR is included in the SR, which is not performed by the existing on-off keying (OOK) method, such that an eNB may detect the data information which is going to be transmitted in the CP zone in advance. In addition, through this, it may be implemented that the eNB may solve collision by using a proper procedure for the resource occupation collision that may be occurred in the CP zone.

FIG. 27 illustrates a UL data transmission method according to an embodiment of the present invention.

Referring to FIG. 27, a UE transmits a UL scheduling request (SR) through a PUCCH resource (S2701).

Herein, the UL SR may include the characteristic information for UL data which are going to be transmitted in an identical TTI (or the next subframe) with being mapped with the UL SR.

For example, in case of FIG. 27, the UL SR may include the information for specifying the transmission of aperiodic short data through 1 step SR.

In addition, the UE transmits the actual UL data through the contention-based radio resource block (CPRB) in an identical TTI (e.g., an identical subframe) as the PUCCH resource that transmits the UL SR (S2703).

The PUCCH resource for one UE is allocated to an RB pair in one subframe, and a PUCCH resource index is configured by a UE-specific higher layer signaling. As described above, the PUCCH resource index is mapped to a combination of a physical resource block (PRB), a cyclic shift (CS) applied to the frequency domain and an orthogonal cover code (OCC) applied to the time domain. That is, the PUCCH resource index specifies the combination of different PRB, CS and OCC.

The CPRB may be determined from any one of one or more contention-based radio resource blocks (CPRBs) included in the contention-based PUSCH zone (CP zone) which is set to the same TTI as the PUCCH resource that transmits the UL SR. For example, the CPRB may be determined by being mapped to the PUCCH resource index that a UE transmits the UL SR.

In FIG. 27, it is assumed that 8 SRs are transmitted in the PUCCH region. That is, it is assumed that 8 different UEs transmit the UL SR in the PUCCH resources which are specified as 8 different PUCCH resource indexes. In this case, the UL data are transmitted in CPRB #1 (2709) which is mapped to an index (2707) of the PUCCH resource in which the UE transmits the UL SR.

Although it is illustrated that the UE transmits the UL data through one CPRB in FIG. 27, the UE may transmit the actual UL data through a plurality of CPRBs (e.g., CPRB #1 and #2), if necessary (e.g., if there are large amount of data).

Like this, in case that the UE transmits the actual UL data through the CPRB determined in the CP zone, the eNB receives the UL SR and decodes the CPRB (i.e., the UL data) which is mapped to the SR at the same time.

Particularly, the eNB detects which data the UE transmits by using which SR procedure through the received SR, and decodes the CPRB mapped to the SR in an identical TTI. In case of FIG. 27, the eNB may detect that the UE transmits aperiodic short data through 1 step SR.

And, the eNB that successfully receives the UL data transmits the HARQ or the ARQ ACK to the corresponding UE through the PHICH, thereby notifying the corresponding data are successfully received (S2705).

As such, according to the present invention, by transmitting the SR and the aperiodic short data in one TTI, the time required to transmit actual UL data becomes the same as the SR transmission periodicity (1 ms to 80 ms).

Referring above Table 11 and Table 12 again, the transmission of UL data of small size which are generated intermittently is completed only with the components 1 and 2 of Table 11 and Table 12, thus, only latency of total 1.5/3.5 ms may occur.

FIG. 27 illustrates a scheduling request method for data of small size which are intermittently/aperiodically generated. Even for the data of small size which are transmitted only when an event is intermittently occurred, the SR procedure of 5 steps should be performed to transmit the data of small size, if the conventional scheduling request method is used. However, by using the scheduling request method according to the present invention, the corresponding data transmission may be completed by transmitting once after the UE transited to the active mode.

FIG. 28 illustrates a UL data transmission method according to an embodiment of the present invention.

Referring to FIG. 28, a UE transmits a UL scheduling request (SR) through a PUCCH resource (S2801).

Herein, the UL SR may include characteristic information for the UL data which are going to be transmitted in an identical TTI (or the next subframe) with being mapped with the UL SR.

For example, in case of FIG. 28, the UL SR may include the information for specifying the transmission of aperiodic short data through 1 step SR.

In addition, the UE transmits the actual UL data through the contention-based radio resource block (CPRB) in an identical TTI (e.g., an identical subframe) as the PUCCH resource that transmits the UL SR (S2803).

The PUCCH resource for one UE is allocated to an RB pair in one subframe, and a PUCCH resource index is configured by a UE-specific higher layer signaling. As described above, the PUCCH resource index is mapped to a combination of a physical resource block (PRB), a cyclic shift (CS) applied to the frequency domain and an orthogonal cover code (OCC) applied to the time domain. That is, the PUCCH resource index specifies the combination of different PRB, CS and OCC.

The CPRB may be determined from any one of one or more contention-based radio resource blocks (CPRBs) included in the contention-based PUSCH zone (CP zone) which is set to the same TTI as the PUCCH resource that transmits the UL SR. For example, the CPRB may be determined by being mapped to the PUCCH resource index that a UE transmits the UL SR.

In FIG. 28, it is assumed that 8 SRs are transmitted in the PUCCH region. That is, it is assumed that 8 different UEs transmit the UL SR in the PUCCH resources which are specified as 8 different PUCCH resource indexes. In this case, the UL data are transmitted in CPRB #1 (2811) which is mapped to an index (2809) of the PUCCH resource in which the UE transmits the UL SR.

Although it is illustrated that the UE transmits the UL data through one CPRB in FIG. 28, the UE may transmit the actual UL data through a plurality of CPRBs (e.g., CPRB #1 and #2), if necessary (e.g., if there are large amount of data).

Like this, in case that the UE transmits the actual UL data through the CPRB determined in the CP zone, the eNB receives the UL SR and decodes the CPRB (i.e., the UL data) which is mapped to the SR at the same time.

Particularly, the eNB detects which data the UE transmits by using which SR procedure through the received SR, and decodes the CPRB mapped to the SR in an identical TTI. In case of FIG. 28, the eNB may detect that the UE transmits aperiodic short data through 1 step SR.

In case that a UE transmits the actual UL data through the CPRB determined within the CP zone, but one or more UE transmits data using the same resource (i.e., the same CPRB), or the data of UE are not successfully transmitted due to channel state deterioration, even though an eNB receives the SR, the eNB fails to perform decoding the CPRB mapped to the SR.

As described above, the eNB may detect whether the corresponding SR is the SR to transmit data using the CPRB, and whether the data to transmit are short data or not, based on the information (i.e., characteristic information for the UL data which are to be transmitted with being mapped with the UL SR) transmitted in the SR.

Accordingly, if the eNB fails to receive the short data transmitted with the CPRB, by transmitting a UL grant through the PDCCH instead of NACK information to the corresponding UE, the eNB performs the UL data transmission based on the UL grant (S2805).

The UE that receives the UL grant from the eNB transmits the actual data using the PUSCH resource through the corresponding UL grant (S2807).

Until the UE receives the UL grant for the UL data from the eNB after transmitting the UL SR, 4 ms is required, and until the UE transmit the UL data to the eNB after receiving the UL grant, 4 ms is required.

Accordingly, according to the present invention, collision of UL data occurs when transmitting aperiodic short data through 1 step SR procedure, and about 9 ms to 89 ms (=SR transmission periodicity (1 ms to 80 ms)+8 ms) until recovering it.

Referring to above Table 11 and Table 12 again, even though the UL data of small size which are intermittently generated only by 1 to 6 components in Table 11 collide, the UL data transmission is completed by recovering the collision, thereby only total 9.5/11.5 ms of latency may occur.

Meanwhile, in case that the UE does not receive the HARQ/ARQ ACK information for the UL data or the UL grant for retransmitting the UL data from the eNB during a predetermined time (e.g., 89 ms) by activating timer after transmitting the UL data (S2801 and S2802) together with the SR in 1 TTI, above described steps S2801 and 2803 may be repeatedly performed.

FIG. 29 illustrates a UL data transmission method according to an embodiment of the present invention.

Referring to FIG. 29, a UE transmits a UL scheduling request (SR) through a PUCCH resource (S2901).

For example, in case of FIG. 29, the UL SR may include the information for specifying the transmission of long data which are sensitive to delay through 1 step SR.

In addition, the UE transmits the first actual UL data through the contention-based radio resource block (CPRB) in an identical TTI (e.g., an identical subframe) as the PUCCH resource that transmits the UL SR (S2903).

The PUCCH resource for one UE is allocated to an RB pair in one subframe, and a PUCCH resource index is configured by a UE-specific higher layer signaling. As described above, the PUCCH resource index is mapped to a combination of a physical resource block (PRB), a cyclic shift (CS) applied to the frequency domain and an orthogonal cover code (OCC) applied to the time domain. That is, the PUCCH resource index specifies the combination of different PRB, CS and OCC.

The CPRB may be determined from any one of one or more contention-based radio resource blocks (CPRBs) included in the contention-based PUSCH zone (CP zone) which is set to the same TTI as the PUCCH resource that transmits the UL SR. For example, the CPRB may be determined by being mapped to the PUCCH resource index that a UE transmits the UL SR.

In FIG. 29, it is assumed that 9 SRs are transmitted in the PUCCH region. That is, it is assumed that 9 different UEs transmit the UL SR in the PUCCH resources which are specified as 9 different PUCCH resource indexes. In this case, the UL data are transmitted in CPRB #1 (2911) which is mapped to an index (2909) of the PUCCH resource in which the UE transmits the UL SR.

Although it is illustrated that the UE transmits the UL data through one CPRB in FIG. 29, the UE may transmit the actual UL data through a plurality of CPRBs (e.g., CPRB #1 and #2), if necessary (e.g., if there are large amount of data).

Like this, in case that the UE transmits the actual UL data through the CPRB determined in the CP zone, the eNB receives the UL SR and decodes the CPRB (i.e., the UL data) which is mapped to the SR at the same time.

Particularly, the eNB detects which data the UE transmits by using which SR procedure through the received SR, and decodes the CPRB mapped to the SR in an identical TTI. In case of FIG. 29, the eNB may detect that the UE transmits long data sensitive to delay through 1 step SR.

Subsequently, the eNB transmits the UL grant for the UL data and the BSR to the UE through the PUCCH (S2905).

Herein, the UL grant may allocate a fixed size of physical resource block (PRB, e.g., one PRB or two PRBs) which are predefined to the UE.

In addition, the UL grant may allocate a size of resource which is the same as initial UL data transmitted through an identical TTI with the UL SR in step S2903 by a UE. For example, in case that the UE uses one CPRB to transmit the initial UL data, the UL grant may allocate one physical resource block (PRB) to the UE. Also, in case that the UE uses two CPRBs to transmit the initial UL data, the UL grant may allocate two physical resource block (PRB) to the UE.

Meanwhile, it is required that the UE should know whether the UL grant transmitted from the eNB in step S2905, is the UL grant for the UL data and the BSR to be transmitted next after the initial UL data (i.e., the UL data transmitted through the CPRB) is successfully received, or the UL grant for the retransmission of the initial UL data and the BSR after failed to receive the initial UL data.

Accordingly, in case that the transmitted UL grant is the UL grant for the next UL data transmission, the eNB may transmit the UL grant that does not include a retransmission indicator (e.g., new data indication (NDI)), or in case that the transmitted UL grant is the UL grant for the retransmission of the initial UL data, to indicate this, the eNB may transmit the UL grant including the retransmission indicator to the UE.

Thus, if the UL grant does not include the retransmission indicator, the UE may detect that the initial UL data are successfully received. On the other hand, if the UL grant includes the retransmission indicator, the UE may detect that the initial UL data are not successfully received.

In addition, different from this, in case that the initial UL data (i.e., the UL data transmitted through the CPRB) are successfully received, the eNB may transmit the UL grant in which the HARQ or ARQ ACK is included to the UE through the PHICH. In this case, when the UE receives the HARQ or ARQ ACK through the PHICH, the UE may detect that the initial UL data are successfully received by the eNB.

Referring to FIG. 29, it is assumed the case that the eNB successfully receives the initial UL data of the UE, and transmits the UL grant that does not include the retransmission indicator to the UE.

The UE transmits the actual data (i.e., the next UL data) and the BSR to the eNB through the PDSCH resource allocated by the UL grant (S2907).

As such, according to the present invention, by transmitting the SR and the initial UL data of long data sensitive to delay in one TTI, the time required to transmit actual initial UL data becomes the same as the SR transmission periodicity (1 ms to 80 ms).

Referring above Table 11 and Table 12 again, the transmission of UL data which are generated from a delay sensitive application is completed only with the components 1 and 2 of Table 11 and Table 12, thus, only latency of total 1.5/3.5 ms may occur.

FIG. 29 illustrates a scheduling request method for the data generated from an application which is sensitive to initial delay. In case of data generated from the application which is sensitive to initial delay, the BSR transmission is required to support consistent data transmission, but it is proposed to transmit the initial data through the CPRB determined within the CP zone in order to quickly perform the initial UL data transmission.

Since the delayed arrival of the initial data which are generated from the application sensitive the delay may influence on sensory delay of a user, decrease of delay on initial data transmission may be utilized as an important factor for decreasing the sensory delay of a user.

Or, fast reception of the initial information according to an application is used for information required to determining whether to consistently connect with the corresponding application/service by a user, and can be utilized as an important factor for decreasing the sensory delay of the user.

FIG. 30 illustrates a UL data transmission method according to an embodiment of the present invention.

Referring to FIG. 30, a UE transmits a UL scheduling request (SR) through a PUCCH resource (S3001).

For example, in case of FIG. 30, the UL SR may include the information for specifying the transmission of long data which are sensitive to delay through 1 step SR.

In addition, the UE transmits the first actual UL data through the contention-based radio resource block (CPRB) in an identical TTI (e.g., an identical subframe) as the PUCCH resource that transmits the UL SR (S3003).

The PUCCH resource for one UE is allocated to an RB pair in one subframe, and a PUCCH resource index is configured by a UE-specific higher layer signaling. As described above, the PUCCH resource index is mapped to a combination of a physical resource block (PRB), a cyclic shift (CS) applied to the frequency domain and an orthogonal cover code (OCC) applied to the time domain. That is, the PUCCH resource index specifies the combination of different PRB, CS and OCC.

The CPRB may be determined from any one of one or more contention-based radio resource blocks (CPRBs) included in the contention-based PUSCH zone (CP zone) which is set to the same TTI as the PUCCH resource that transmits the UL SR. For example, the CPRB may be determined by being mapped to the PUCCH resource index that a UE transmits the UL SR.

In FIG. 30, it is assumed that 8 SRs are transmitted in the PUCCH region. That is, it is assumed that 8 different UEs transmit the UL SR in the PUCCH resources which are specified as 8 different PUCCH resource indexes. In this case, the UL data are transmitted in CPRB #1 (3011) which is mapped to an index (3009) of the PUCCH resource in which the UE transmits the UL SR.

Although it is illustrated that the UE transmits the UL data through one CPRB in FIG. 30, the UE may transmit the actual UL data through a plurality of CPRBs (e.g., CPRB #1 and #2), if necessary (e.g., if there are large amount of data).

Like this, in case that the UE transmits the actual UL data through the CPRB determined in the CP zone, the eNB receives the UL SR and decodes the CPRB (i.e., the UL data) which is mapped to the SR at the same time.

Particularly, the eNB detects which data the UE transmits by using which SR procedure through the received SR, and decodes the CPRB mapped to the SR in an identical TTI. In case of FIG. 30, the eNB may detect that the UE transmits long data sensitive to delay through 1 step SR.

In case that a UE transmits the actual UL data through the CPRB determined within the CP zone, but one or more UE transmits data using the same resource (i.e., the same CPRB), or the data of UE are not successfully transmitted due to channel state deterioration, even though an eNB receives the SR, the eNB fails to perform decoding the CPRB mapped to the SR.

As described above, the eNB may detect whether the corresponding SR is the SR to transmit data using the CPRB, and whether the data to transmit are long data sensitive to delay or not, based on the information (i.e., characteristic information for the UL data which are to be transmitted with being mapped with the UL SR) transmitted in the SR.

Accordingly, if the eNB fails to receive the initial UL data transmitted with the CPRB, by transmitting a UL grant through the PUCCH that includes the retransmission indicator to the corresponding UE, the eNB performs the retransmission of the initial UL data (S3005).

In addition, the eNB may transmit the NACK information to the corresponding UE through the PHICH, and may also transmit the UL grant for retransmitting the initial UL data.

As such, the UE receives the UL grant including the retransmission indicator through the PDCCH, or receives the NACK information through the PHICH, thereby detecting that the initial data are not successfully received at the eNB.

Referring to FIG. 30, it is assumed the case that the eNB does not successfully receive the initial UL data of the UE, and transmits the UL grant that includes the retransmission indicator to the UE.

The UE transmits the actual data (i.e., the initial UL data) and the BSR to the eNB through the PUSCH resource allocated by the UL grant (S3007).

Until the UE receives the UL grant for the retransmission of the initial UL data from the eNB after transmitting the UL SR, 4 ms is required, and until the UE transmit the initial UL data to the eNB after receiving the UL grant, 4 ms is required.

Accordingly, according to the present invention, collision of UL data occurs when transmitting the long data sensitive to delay through 1 step SR procedure, and about 9 ms to 89 ms (=SR transmission periodicity (1 ms to 80 ms)+8 ms) until recovering it.

Referring to above Table 11 and Table 12 again, even though the UL data which are generated from the delay sensitive application only by 1 to 6 components in Table 11 collide, the UL data transmission is completed by recovering the collision, thereby only total 9.5/11.5 ms of latency may occur.

Meanwhile, in case that the UE does not receive the HARQ/ARQ ACK information for the UL data or the UL grant for the UL data/the BSR from the eNB during a predetermined time (e.g., 89 ms) by driving inner timer after transmitting the initial UL data (steps S3001 and S3002) together with the SR in 1 TTI, above described steps S3001 and 3003 may be repeatedly performed.

Apparatus for Implementing the Present Invention

FIG. 31 is a block diagram of a wireless communication apparatus according to an embodiment of the present invention.

Referring to FIG. 31, a wireless communication system includes a eNB 3110 and a plurality of UEs 3120 belonging to the eNB 3110. The eNB 3110 include both the aforementioned MeNB and SeNB.

The eNB 3110 includes a processor 3111, a memory 3112, a radio frequency (RF) unit 3113. The processor 3111 may be configured to implement the functions, procedures and/or methods proposed by the present invention as described in FIG. 1-30. Layers of a wireless interface protocol may be implemented by the processor 3111. The memory 3112 is connected to the processor 3111 and stores various types of information for operating the processor 3111. The RF unit 3113 is connected to the processor 3111, transmits and/or receives an RF signal.

The UE 3120 includes a processor 3121, a memory 3122, and an RF unit 3123. The processor 3121 may be configured to implement the functions, procedures and/or methods proposed by the present invention as described in FIG. 1-30. Layers of a wireless interface protocol may be implemented by the processor 3121. The memory 3122 is connected to the processor 3111 and stores information related to operations of the processor 3122. The RF unit 3123 is connected to the processor 3111, transmits and/or receives an RF signal.

The memories 3112 and 3122 may be located inside or outside the processors 3111 and 3121 and may be connected to the processors 3111 and 3121 through various well-known means. The eNB 3110 and/or UE 3120 may include a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although the method for requesting scheduling for transmitting UL data in the wireless communication system of the present invention is described mainly for the example applied to 3GPP LTE/LTE-A system, it is also possible to be applied to various wireless communication system as well as 3GPP LTE/LTE-A system.

The invention claimed is:

1. A method for transmitting uplink data in a wireless communication system, the method comprising:
receiving, by a user equipment, configuration information of a contention-based radio resource from a base station,
wherein the configuration information includes uplink resource information in which a contention-based physical uplink shared channel (PUSCH) zone (CP zone) is configured,
wherein the CP zone is a resource region in which one or more contention-based PUSCH resource blocks allocated within a subframe are available, and
wherein the CP zone is independently configured for each uplink transmission procedure and set to a same pattern in at least one subframe;
transmitting, by the user equipment, a scheduling request including information indicating a service characteristic of uplink data; and
transmitting, by the user equipment, the uplink data on a contention-based PUSCH resource block that can transmit the uplink data without an uplink grant of the base station,
wherein an uplink signal related to the uplink data and the uplink data are transmitted in an identical subframe.

2. The method of claim 1, wherein the contention-based PUSCH resource block in the CP zone is determined based on a physical uplink control channel (PUCCH) resource index in which the scheduling request is transmitted.

3. The method of claim 2,
wherein the service characteristic of the uplink data includes aperiodic short data, data generated by an application which is sensitive to delay, data that does not require resource allocation for buffer status report (BSR) transmission, or data that requires resource allocation for BSR transmission.

4. The method of claim 1, further comprising receiving, by the user equipment, a hybrid automatic repeat request (HARQ) or automatic repeat request (ARQ) acknowledgement (ACK) information, if the uplink data are successfully received by the base station.

5. The method of claim 1, further comprising receiving, by the user equipment, an uplink grant for retransmitting the uplink data from the base station, if the uplink data are not successfully received by the base station.

6. The method of claim 1, further comprising receiving, by the user equipment, an uplink grant for transmitting next uplink data of the uplink data and for a buffer status report, if the uplink data are successfully received by the base station.

7. The method of claim 6, further comprising receiving, by the user equipment, a hybrid automatic repeat request (HARQ) or automatic repeat request (ARQ) acknowledgement (ACK) information, if the uplink data are successfully received by the base station.

8. The method of claim 1, further comprising receiving, by the user equipment, an uplink grant for retransmitting the uplink data and for a buffer status report, if the uplink data are not successfully received by the base station.

9. The method of claim 8, wherein the uplink grant for retransmitting the uplink data and for a buffer status report includes a retransmission indicator for retransmitting the uplink data.

10. The method of claim 8, further comprising receiving, by the user equipment, a hybrid automatic repeat request (HARQ) or automatic repeat request (ARQ) non-acknowledgement (NACK) information, if the uplink data are not successfully received by the base station.

11. A user equipment for transmitting uplink data in a wireless communication system, comprising:
a radio frequency (RF) unit for transmitting and receiving a radio signal; and
a processor,
wherein the processor is configured to perform:
receiving configuration information of a contention-based radio resource from a base station,
wherein the configuration information includes uplink resource information in which a contention-based physical uplink shared channel (PUSCH) zone (CP zone) is configured,
wherein the CP zone is a resource region in which one or more contention-based PUSCH resource blocks allocated within a subframe are available, and
wherein the CP zone is independently configured for each uplink transmission procedure and set to a same pattern in at least one subframe;
transmitting, by the user equipment, a scheduling request including information indicating a service characteristic of uplink data; and
transmitting the uplink data on a contention-based PUSCH resource block that can transmit the uplink data without an uplink grant of the base station,
wherein an uplink signal related to the uplink data and the uplink data are transmitted in an identical subframe.

12. The method of claim 1, wherein a maximum resource block size per user equipment, a modulation and coding scheme (MCS) level and an initial transmission power reference are independently configured for each CP zone.

13. The method of claim 1, wherein the uplink transmission procedure includes a random access procedure or an uplink transmission procedure other than the random access procedure.

14. The method of claim 13, wherein, when the uplink transmission procedure includes the random access procedure, the uplink signal is a random access preamble.

15. The method of claim 13, wherein, when the uplink transmission procedure includes the uplink transmission procedure other than the random access procedure, the uplink signal is a scheduling request.

* * * * *